(12) United States Patent
Aggarwal et al.

(10) Patent No.: US 9,877,375 B2
(45) Date of Patent: Jan. 23, 2018

(54) INTERACTIVE USER INTERFACE FUNCTIONALITY FOR LIGHTING DEVICES OR SYSTEM

(71) Applicant: ABL IP HOLDING LLC, Conyers, GA (US)

(72) Inventors: Januk Aggarwal, Tysons Corner, VA (US); Jason Rogers, Herndon, VA (US); Jack C. Rains, Jr., Herndon, VA (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/228,463

(22) Filed: Aug. 4, 2016

(65) Prior Publication Data

US 2016/0345412 A1    Nov. 24, 2016

Related U.S. Application Data

(63) Continuation of application No. 13/971,428, filed on Aug. 20, 2013, now Pat. No. 9,462,663, which is a
(Continued)

(51) Int. Cl.
*H05B 37/00* (2006.01)
*H05B 39/00* (2006.01)
(Continued)

(52) U.S. Cl.
CPC ....... *H05B 37/0227* (2013.01); *H05B 37/029* (2013.01); *H05B 37/0236* (2013.01);
(Continued)

(58) Field of Classification Search
CPC ............ H05B 37/0227; H05B 37/0245; H05B 37/029; Y02B 20/44; Y02B 20/48
(Continued)

(56) References Cited

U.S. PATENT DOCUMENTS 4,749,254 A    6/1988  Seaver
5,705,804 A    1/1998  Ramer et al.
(Continued)

FOREIGN PATENT DOCUMENTS

WO    2011121470 A1    10/2011

OTHER PUBLICATIONS

Notice of Allowance for U.S. Appl. No. 15/259,612, dated Feb. 1, 2017, 12 pages.
(Continued)

*Primary Examiner* — Daniel D Chang
(74) *Attorney, Agent, or Firm* — RatnerPrestia

(57) ABSTRACT

An example of a lighting system includes intelligent lighting devices, each of which includes a light source, a communication interface and a processor coupled to control the light source. In such a system, at least one of the lighting devices includes a user input sensor to detect user activity related to user inputs without requiring physical contact of the user; and at least one of the lighting devices includes an output component to provide information output to the user. One or more of the processors in the intelligent lighting devices are further configured to process user inputs detected by the user input sensor, control lighting and control output to a user via the output component so as to implement an interactive user interface for the system, for example, to facilitate user control of lighting operations of the system and/or to act as a user interface portal for other services.

25 Claims, 9 Drawing Sheets

Related U.S. Application Data continuation-in-part of application No. 13/903,428, filed on May 28, 2013, now Pat. No. 9,504,132.

(51) Int. Cl.
*H05B 41/00* (2006.01)
*H05B 37/02* (2006.01)

(52) U.S. Cl.
CPC .......... *H05B 37/0245* (2013.01); *Y02B 20/44* (2013.01); *Y02B 20/48* (2013.01)

(58) Field of Classification Search
USPC ........................................................ 315/312
See application file for complete search history.

(56) References Cited

U.S. PATENT DOCUMENTS

| | | | |
|---|---|---|---|
| 5,769,527 | A | 6/1998 | Taylor |
| 5,877,490 | A | 3/1999 | Ramer et al. |
| 5,914,487 | A | 6/1999 | Ramer et al. |
| 6,009,455 | A | 12/1999 | Doyle |
| 6,043,873 | A | 3/2000 | Ramer et al. |
| 6,363,434 | B1 | 3/2002 | Eytchison |
| 6,548,967 | B1 | 4/2003 | Dowling et al. |
| 7,003,547 | B1 | 2/2006 | Hubbard |
| 7,333,903 | B2 | 2/2008 | Walters et al. |
| 7,546,167 | B2 | 6/2009 | Walters et al. |
| 7,925,384 | B2 | 4/2011 | Huizenga et al. |
| 8,130,371 | B2 | 3/2012 | Imura |
| 8,140,276 | B2 | 3/2012 | Walters et al. |
| 8,732,031 | B2 | 5/2014 | Martin et al. |
| 8,755,039 | B2 | 6/2014 | Ramer |
| 2002/0016639 | A1 | 2/2002 | Smith et al. |
| 2004/0036006 | A1* | 2/2004 | Dowling .................. F41H 3/00 250/205 |
| 2004/0052076 | A1* | 3/2004 | Mueller .............. F21V 23/0442 362/293 |
| 2006/0075407 | A1 | 4/2006 | Powers et al. |
| 2006/0075408 | A1 | 4/2006 | Powers et al. |
| 2007/0045524 | A1 | 3/2007 | Rains et al. |
| 2007/0268687 | A1 | 11/2007 | Scannell, Jr. |
| 2008/0265799 | A1* | 10/2008 | Sibert ................ H05B 37/0245 315/292 |
| 2009/0051506 | A1 | 2/2009 | Hicksted |
| 2009/0299527 | A1 | 12/2009 | Huizenga |
| 2010/0114340 | A1 | 5/2010 | Huizenga |
| 2010/0176733 | A1 | 7/2010 | King |
| 2010/0259931 | A1 | 10/2010 | Chemel et al. |
| 2010/0301769 | A1 | 12/2010 | Chemel et al. |
| 2012/0002406 | A1 | 1/2012 | Leadford |
| 2012/0025717 | A1 | 2/2012 | Klusmann |
| 2012/0040606 | A1 | 2/2012 | Verfuerth |
| 2012/0044350 | A1* | 2/2012 | Verfuerth ........... H05B 37/0272 348/143 |
| 2012/0086561 | A1 | 4/2012 | Ilyes |
| 2012/0130548 | A1 | 5/2012 | Fadell |
| 2012/0229048 | A1* | 9/2012 | Archer ............... H05B 37/0245 315/297 |
| 2012/0299486 | A1 | 11/2012 | Birru |
| 2013/0159754 | A1 | 6/2013 | Wendt |
| 2013/0293112 | A1* | 11/2013 | Reed .................. H05B 37/0272 315/131 |
| 2014/0035482 | A1 | 2/2014 | Rains, Jr. et al. |

OTHER PUBLICATIONS

Non Final Office Action for U.S. Appl. No. 15/363,526, dated Feb. 10, 2017, 17 pages.

Entire prosecution history of U.S. Appl. No. 13/971,428, filed Aug. 20, 2013, entitled "Interactive User Interface Functionality for Lighting Devices or System."

"Introducing Philips hue: the world's smartest LED bulb, marking a new era in home lighting"; Philips Sense and Simplicity; http://www.newscenter.philips.com/main/standard/news/press/2012/20121029-Introducing- . . . ; Oct. 29, 2012; Amsterdam, The Netherlands.

Chris Davies; "Philips hue Review"; SlashGear; http://www.slashgear.com/philips-hue-review-07255995/; Nov. 7, 2012, London, United Kingdom.

"Raspberry Pi a $30 Computer set to Revolutionize the Teaching of Computing"; Silver-Fish hubpages; http://silver-fish.hubpages.com/hub/Raspberry-Pi-a-30-Computer; Aug. 15, 2012.

Entire prosecution history of U.S. Appl. No. 13/564,519, filed Aug. 1, 2012, entitled "Networked System of Intelligent Lighting Devices With Sharing of Processing Resources of the Devices With Other Entities."

Entire prosecution history of U.S. Appl. No. 13/903,428, filed May 28, 2013, entitled "Distributed Processing Using Resources of Intelligent Lighting Elements of a Lighting System."

Entire prosecution history of U.S. Appl. No. 13/903,330, filed May 28, 2013, entitled "Lighting Network with Autonomous Commissioning."

Entire prosecution history of U.S. Appl. No. 13/463,594, filed May 3, 2012, entitled "Lighting Devices With Sensors for Detecting One or More External Conditions and Networked System Using Such Devices."

Non-final Office Action issued in U.S. Appl. No. 13/971,194, dated Dec. 9, 2015.

Notice of Allowance dated Apr. 5, 2106, issued in U.S. Appl. No. 13/903,428, filed May 28, 2013.

Notice of Allowance dated Mar. 18, 2016, issued in U.S. Appl. No. 14/219,657, filed Mar. 19, 2014.

Non-final Office Action dated Jun. 23, 2016, issued in U.S. Appl. No. 13/971,194, filed Aug. 20, 2013.

Notice of Allowance for U.S. Appl. No. 13/971,194, dated Oct. 24, 2016, 16 pages.

Non Final Office Action for U.S. Appl. No. 15/259,612, dated Nov. 17, 2016, 16 pages.

Final Office Acftion dated May 3, 2017, issued in U.S. Appl. No. 15/363,526, filed Nov. 29, 2016, 19 pages. 2017.

Non-Final Office Acton dated Mar. 30, 2015, issued in U.S. Appl. No. 14/507,222, filed Oct. 6, 2014, 60 pages.

Non-Final Office Action dated Mar. 26, 2015, issued in U.S. Appl. No. 14/219,657, filed Mar. 19, 2014, 58 pages.

Non-Final Office Action dated Mar. 20, 2015, issued in U.S. Appl. No. 13/964,564, filed Aug. 12, 2013, 44 pages.

International Search Rep;ort and Written Opinion of International Application No. PCT/US2013/050647, dated Jan. 9, 2014, 10 pages.

International Search Report and Written Opinion of International Application No. PCT/US2013/037968, dated Jul. 2, 2013, 9 pages.

Entire prosecution History of U.S. Appl. No. 14/285,881, filed May 23, 2014, entitled "Lighting Devices With Sensors for Detecting One or More External Conditions and Networked System Using Such Devices."

Entire prosecution History of U.S. Appl. No. 13/463,586, filed May 3, 2012, entitled "Networked Arcfhitecture for System of Lighting Devices Having Sensors, for Intelligent Applications."

Notice of Allowance for U.S. Appl. No. 15/259,612, dated Jun. 5, 2017, 11 pages.

Notice of Allowance dated Jul. 14, 2017, issued in U.S. Appl. No. 15/363,526, filed Nov. 29, 2016, 5 pages.

Non Final Office Action for U.S. Appl. No. 15/720,546, dated Oct. 30, 2017, 11 pages.

\* cited by examiner

INTERACTIVE USER INTERFACE FUNCTIONALITY FOR LIGHTING DEVICES OR SYSTEM

RELATED APPLICATIONS

This application is a continuation of U.S. application Ser. No. 13/971,428, Filed Aug. 20, 2013 entitled "INTERACTIVE USER INTERFACE FUNCTIONALITY FOR LIGHTING DEVICES OR SYSTEM," which is a continuation-in-part of U.S. application Ser. No. 13/903,428, Filed May 28, 2013 entitled "DISTRIBUTED PROCESSING USING RESOURCES OF INTELLIGENT LIGHTING ELEMENTS OF A LIGHTING SYSTEM," the disclosures of which are entirely incorporated herein by reference.

U.S. application Ser. No. 13/971,428 also is related to U.S. application Ser. No. 13/903,330, Filed May 28, 2013 entitled "LIGHTING NETWORK WITH AUTONOMOUS COMMISSIONING," the disclosure of which is entirely incorporated herein by reference.

U.S. application Ser. No. 13/971,428 also is related to U.S. application Ser. No. 13/964,564, Filed Aug. 12, 2013 entitled "LIGHTING ELEMENT-CENTRIC NETWORK OF NETWORKS," the disclosure of which is entirely incorporated herein by reference.

TECHNICAL FIELD

The present subject matter relates to techniques and equipment to provide an interactive user interface for lighting purposes, for example, to allow a user to control lighting and/or to access other services via a lighting device and associated data network.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use.

Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often traditional lighting devices are controlled individually or as relatively small groups at separate locations.

With the advent of modern electronics has come advancement, including advances in the types of light sources as well as advancements in networking and control capabilities of the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. As increased processing capacity finds its way into the lighting devices, it becomes relatively easy to incorporate associated communications capabilities, e.g. to allow lighting devices to communicate with system control elements and/or with each other. In this way, advanced electronics in the lighting devices as well as the associated control elements have facilitated more sophisticated lighting control algorithms as well as increased networking of lighting devices.

However, there have also been proposals to further enhance lighting controls. For example, it has been proposed that a lighting device may include a sensor and processing capability to detect gestural inputs from a user. If the sensor detects touch, the user must approach the device or an associated control panel and contact the touch sensor in an appropriate manner to input a gestural corresponding to the user's desired control of the light. More recent developments in gestural sensing technologies eliminate the need for actual touching, but such devices still typically require that the user make the appropriate gesture in fairly close proximity to the sensor on the device or at the control panel.

There have also been efforts to develop speech-command responsive control of lighting, using advanced speech recognition technologies.

In a somewhat related field a variety of entities are proposing controls for lighting and other functions in a building from a variety of portable user devices, for example, from remote controls or from mobile devices such as smartphones or tablet computers.

Despite such recent efforts, there is still room for further improvement in the user interface with a lighting system and/or in the functions that a lighting system may offer through its user interface.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1A:
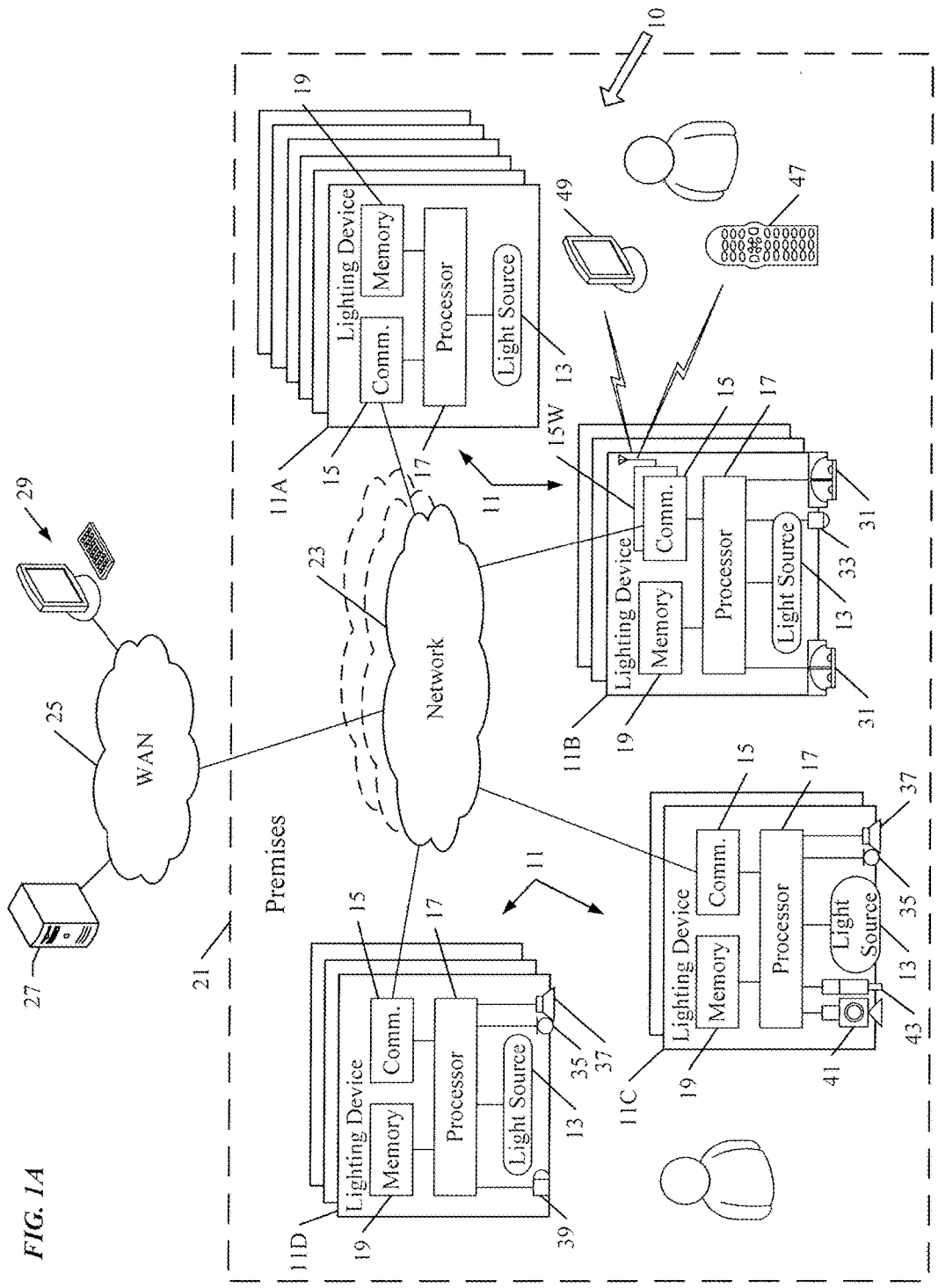
FIG. 1A is a functional block diagram of a simple example of a system having intelligent lighting devices, at least some of which include components and are configured to implement an interactive user interface.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As lighting devices incorporate more intelligence, people are beginning to add more functionality, such as more sophisticated user interactivity. The world is becoming interconnected. The trend in technologies that control lighting is toward an "Internet of things" in which more and more machines are interconnected to communicate with each other and interact with the users via the Internet. However, there are many diverse ways to access the Internet, for example, with a computer via wired or fiber network (even with a WiFi local link) or with a mobile device (e.g. smartphone or tablet) via any of the various available public and private wireless networks.

For lighting, the lighting devices and controllers and possibly some central control element (e.g. a server) may communicate with each other via a network. The user in turn communicates with such a system via the Internet using one of these common access techniques. So, the user is coming in from another network that may be separate from the networking used for communications of the lighting system elements. The user also has their own device, albeit of their choosing, but separate and in addition to the elements of the lighting system. Such user access may be part of the problem. For example, use of other access technologies adds to the complexity of the system; and the integration of the lighting network with other user devices, may entail use of separate user device programming in addition to special programming in the lighting system, and/or may increase overall costs. In some cases, the additional devices and/or their software may not be adequately adapted to the lighting system and its operations.

To improve the user experience and provide a more effective or more efficient user interface, the various examples of a lighting system discussed below and shown in the drawings offer an interactive user interface implemented with the input and/or output components and associated processing functionality in one or more of the lighting devices. Stated another way, the lighting devices themselves implement the interactive user interface to the lighting system, and the user interacts with the lighting system via the lighting devices.

The system having the user interface via the lighting devices also will enable use of the light fixture or lamp as a user interface portal, for accessing the system itself for lighting functions and possibly other non-lighting functions controlled via the network. However, the system also offers the user access to outside network resources, e.g. via the Internet. The fixture may offer a voice interface (recognition for input and audible sound/speech output) or a more visual interface (e.g. movement or gesture recognition and a projector or the like for visible output) or various combinations of audio and visual input/output capabilities. The light outputs may also be controlled in a manner that conveys information to a person in the vicinity. The user no longer needs to operate a separate terminal, such as their computer, tablet or smartphone, although other devices may utilize the network either for additional user interfaces or for control or communications via the lighting system and the network facilities of the lighting system.

Reference now is made in detail to the examples illustrated in the accompanying drawings and discussed below. FIG. 1A illustrates an example of the system 10 in block diagram form. The illustrated example of the system 10 includes a number of intelligent lighting devices 11, such as fixtures or lamps or other types of luminaires. Several different configurations of the lighting devices 11 are shown by way of examples. The represented differences amongst the examples of devices 11 will be discussed more fully later.

The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device 11 may provide light for use by automated equipment, such as sensors/monitors, robots, etc. that may occupy or observe the illuminated space, instead of or in addition to light provided for an organism. A lighting device 11, for example, may take the form of a lamp, light fixture or other luminaire that incorporates a source, where the source by itself contains no intelligence or communication capability (e.g. LEDs or the like, or lamp ("regular light bulbs") of any suitable type). Alternatively, a fixture or luminaire may be relatively dumb but include a source device (e.g. a "light bulb") that incorporates the intelligence and communication capabilities discussed herein. In most examples, the lighting device(s) 11 illuminate a service area to a level useful for a human in or passing through the space, e.g. regular illumination of a room or corridor in a building or of an outdoor space such as a street, sidewalk, parking lot or performance venue. However, it is also possible that one or more lighting devices 11 in or on a particular premises 21 served by a system 10 have other lighting purposes, such as signage for an entrance or to indicate an exit. Of course, the lighting devices 11 may be configured for still other purposes, e.g. to benefit human or non-human organisms or to repel or even impair certain organisms or individuals.

Each respective intelligent lighting device 11 includes a light source 13, a communication interface 15 and a processor 17 coupled to control the light source 13. The light sources may be virtually any type of light source suitable to providing illumination that may be electronically controlled. The light may be of the same general type in all of the lighting devices, e.g. all formed by some number of light emitting diodes (LEDs); although in many installations, some number of the lighting devices 11 may have different types of light sources 13.

The processor 17 also is coupled to communicate via the interface 15 and the network link with one or more others of the intelligent lighting devices 11 and is configured to control operations of at least the respective lighting device 11. The processor may be implemented via hardwired logic circuitry, but in the examples, the processor 17 is a programmable processor such as a the central processing unit (CPU) of a microcontroller or a microprocessor. Hence, in the example of FIG. 1A, each lighting device 11 also includes a memory 19, storing programming for execution by the processor 17 and data that is available to be processed or has been processed by the processor 17. The processors and memories in the lighting devices may be substantially the same throughout the devices 11 throughout the premises, or different devices 11 may have different processors 17 and/or different amounts of memory 19, depending on differences in intended or expected processing needs.

In the examples, the intelligence (e.g. processor 17 and memory 19) and the communications interface(s) 15 are shown as integrated with the other elements of the lighting device or attached to the fixture or other element that incorporates the light source. However, for some installations, the light source may be attached in such a way that there is some separation between the fixture or other element that incorporates the electronic components that provide the intelligence and communication capabilities. For example, the communication component(s) and possibly the processor and memory (the 'brain') may be elements of a separate device or component coupled and/or collocated with the light source 13.

In our example, the system 10 is installed at a premises 21. The system 10 also includes a data communication network 23 that interconnects the links to/from the communication interfaces 15 of the lighting devices 11, so as to provide data communications amongst the intelligent lighting devices 11. Such a data communication network 23 also is configured to provide data communications for at least some of the intelligent lighting devices 11 via a data network 25 outside the premises, shown by way of example as a wide area network (WAN), so as to allow devices 11 or other elements/equipment at the premises 21 to communicate with outside devices such as the server/host computer 27 and the user terminal device 29. The wider area network 25 outside the premises, may be an intranet or the Internet, for example.

The premises 21 may be any location or locations serviced for lighting and other purposes by a networked intelligent lighting system of the type described herein. The lighting devices 11 are located to provide lighting service in various areas in or about the premises 21. Most of the examples discussed below focus on building installations, for convenience, although the system may be readily adapted to outdoor lighting. Hence, the example of system 10 provides lighting and possibly other services in a number of service areas in or associated with a building, such as various rooms, hallways, corridors or storage areas of a building and an outdoor area associated with a building. Any building forming or at the premises 21, for example, may be an individual or multi-resident dwelling or may provide space for one or more enterprises and/or any combination of residential and enterprise facilities.

The lighting devices 11, as well as any other equipment of the system or that uses the network 23 in the service areas of the premises 21, connect together with and through the network links and any other media forming the communication network 23. For lighting operations, the lighting devices 11 (and other system elements if any) for a given service area are coupled together for network communication with each other through data communication media to form a portion of a physical data communication network. Similar elements in other service areas of the premises are coupled together for network communication with each other through data communication media to form one or more other portions of the physical data communication network at the premises 21. The communication interface 15 in each lighting device 11 in a particular service area will be of a physical type and configured to operate in a manner that is compatible with the physical media and electrical protocol(s) implemented for the particular service area and/or throughout the premises 23. Although the communication interfaces 15 are shown communicating to/from the network cloud via lines, such as wired links or optical fibers; some or all of the interfaces 15 may use wireless communications media such as optical or radio frequency wireless communication. Also, although the examples in FIG. 1A show most of the lighting devices 11 having one communication interface, some or all of the lighting devices 11 may have two or more communications interfaces to enable data communications over different media with the network(s) and/or with other devices in the vicinity.

The various portions of the network in the service areas in turn are coupled together to form a data communication network at the premises, for example to form a premises-wide local area network (LAN) or the like. The overall premises network, generally represented by the cloud 23 in the drawing, encompasses the data links to/from individual devices 11 and any networking interconnections within respective areas of the premises where the devices 11 are installed as well as the LAN or other premises-wide interconnection and associated switching or routing. In many installations, there may be one overall data communication network 21 at the premises. However, for larger premises and/or premises that may actually encompass somewhat separate physical locations, the premises-wide network may actually be built of somewhat separate but interconnected physical networks represented by the dotted line clouds. The LAN or other data network forming the backbone of system network 23 at the premises 21 may be a data network installed for other data communications purposes of the occupants; or the LAN or other implementation of the network 23, may be a data network of a different type installed substantially for lighting system use and for use by only those other devices at the premises that are granted access by the lighting system elements (e.g. by the lighting devices 11).

Hence, there typically will be data communication links within a room or other service area as well as data communication links from the lighting devices 11 in the various rooms or other service areas out to wider network(s) forming the data communication network 23 or the like at the premises 21. Devices 11 within a service area can communicate with each other, with devices 11 in different rooms or other areas, and in at least some cases, with equipment such as 27 and 29 outside the premises 21.

Various network links within a service area, amongst devices in different areas and/or to wider portions of the network 23 may utilize any convenient data communication media, such as power lines wiring, separate wiring such as coax or Ethernet cable, optical fiber, free-space optical, or radio frequency wireless (e.g. Bluetooth or WiFi); and a particular premises 21 may have an overall data network 23 that utilizes combinations of available networking technologies. Some or all of the network communication media may be used by or made available for communications of other gear, equipment or systems within the premises 21. For example, if combinations of WiFi and wired or fiber Ethernet are used for the lighting system communications, the WiFi and Ethernet may also support communications for various computer and/or user terminal devices that the occupant(s) may want to use in the premises. The data communications media may be installed at the time as part of installation of the lighting system 10 at the premises 21 or may already be present from an earlier data communication installation. Depending on the size of the network 23 and the number of devices and other equipment expected to use the network 23 over the service life of the network 23, the network 23 may also include one or more packet switches, routers, gateways, etc.

In addition to a communication interface 15 for enabling a lighting device to communicate via the network 23, some of the devices 11 may include an additional communication interface, shown as a wireless interface 15W in the lighting device 11B. The additional interface allows other elements or equipment to access the communication capabilities of the system 10, for example, as an alternative user interface access or for access through the system 10 to the WAN 25.

A host computer or server like 27 can be any suitable network-connected computer, tablet, mobile device or the like programmed to implement desired network-side functionalities. Such a device may have any appropriate data communication interface to link to the WAN 25. Alternatively or in addition, a host computer or server similar to 25 may be operated at the premises 21 and utilize the same networking media that implements data network 23.

The user terminal equipment such as that shown at 29 may be implemented with any suitable processing device that can communicate and offer a suitable user interface. The terminal 29, for example, is shown as a desktop computer with a wired link into the WAN 25. However, other terminal types, such as laptop computers, notebook computers, netbook computers, and smartphones may serve as the user terminal computers. Also, although shown as communicating via a wired link from the WAN 25, such a user terminal device may also or alternatively use wireless or optical media; and such a device may be operated at the premises 21 and utilize the same networking media that implements data network 23.

For various reasons, the communications capabilities provided at the premises 21 may also support communications of the lighting system elements with user terminal devices and/or computers (not shown) within the premises 21. The user terminal devices and/or computers within the premises may use communications interfaces and communications protocols of any type(s) compatible with the on-premises networking technology of the system 10. Such communication with a user terminal, for example, may allow a person in one part of the premises 21 to communicate with a lighting device 11 in another area of the premises 21, to obtain data therefrom and/or to control lighting or other system operations in the other area.

The external elements, represented generally by the server/host computer 27 and the user terminal device 29, which may communicate with the intelligent elements of the system 10 at the premises 21, may be used by various entities and/or for various purposes in relation to operation of the lighting system 10 and/or to provide information or other services to users within the premises 21, e.g. via the interactive user interface portal offered by the lighting devices 11.

Returning now to the lighting devices 11, in the example of the system 10, at least one of the intelligent lighting devices 11 includes a user input sensor configured to detect user activity related to user inputs without requiring physical contact of the user; and at least one of the intelligent lighting devices 11 includes an output component configured to provide information output to the user. The drawings shows several different examples of these input/output elements.

By contrast, some of the lighting devices 11 may not have user interface related elements. In the example of system 10 in FIG. 1A, each of the lighting devices 11A includes a light source 13, a communication interface 15 linked to the network 23 and a processor 17 coupled to control the light source 13 and to communicate via the interface 15 and the link to network 23. Such devices 11A may include lighting related sensors (not shown), such as occupancy sensors or ambient light color or level sensors; but the intelligent lighting devices 11A do not include any user interface components, for user input or for output to a user (other than control of the respective light source 13). The processors of devices 11A are configured (e.g. programmed in our example) to control lighting operations, for example, to control the light sources 13 of such devices 11A in response to commands received via the network 23 and the interfaces 15.

Figure 1B:
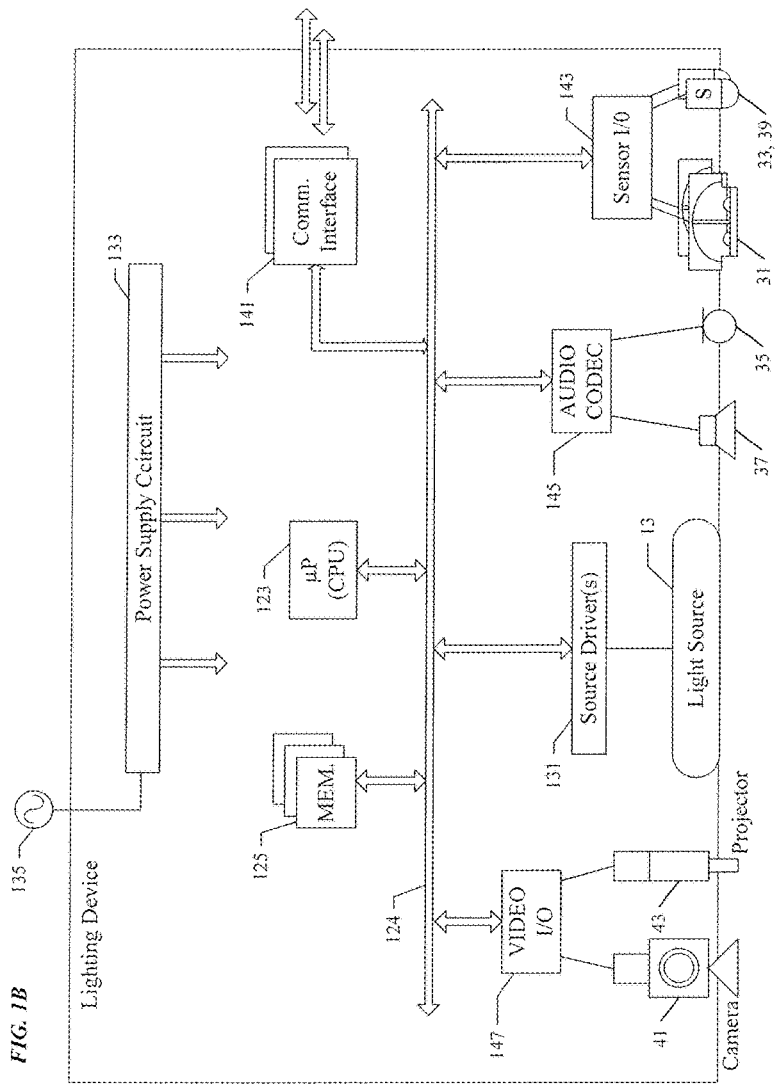
FIG. 1B is a functional block diagram of an example of an intelligent lighting device that may be used in the system of FIG. 1A.

For purposes of discussion, the drawing (FIG. 1A) shows three examples of lighting devices 11B, 11C and 11D that have one or more user interface components. Although three examples are shown, it is envisaged that still other types of interface components and/or arrangements thereof in various intelligent lighting devices may be used in any particular implementation of a system like the system 10 of FIG. 1A; and the later more detailed example of FIG. 1B shows a device that incorporates a combination of several different user input and output components. Any one intelligent lighting device that include components to support the interactive user interface functionality of the system 10 may include an input sensor type user interface component, an output type user interface component, or a combination of one or more input sensor type user interface components with one or more output type user interface components.

With reference to FIG. 1A, each of some number of intelligent lighting device 11B at the premises 21 includes one or more sensors 31 (two in the illustrated example). The lighting devices 11B can be in one or more rooms or other service areas at the premises 21. In the intelligent lighting devices 11B, each of the sensors 31 is configured for detection of intensity of received light and to support associated signal processing to determine direction of incident light. A particular example of a sensor 31 that can be used as an input device for determining direction and intensity of incident light received by the sensor 31 is a quadrant hemispherical light detector or "QHD" (see e.g. U.S. Pat. Nos. 5,877,490 and 5,914,487). The sensors 31 may detect light in some or all of the visible portion of the spectrum or in other wavelength bands, such as infrared (IR) or ultraviolet (UV). By using two or more such sensors 31 in the same or a different lighting device 11B illuminating the same service area, it is possible to detect position of an illuminated point or object in three-dimensional space relative to known positions of the sensors 31. By detecting position of one or more points over time, it becomes possible to track motion within the area illuminated by the device(s) 11B and monitored for user input by their sensors 31, for example, as a gestural user input. Although two sensors 31 are shown on one lighting device 11B; there may be more sensors 31 in a lighting device 11B, or there may be a single sensor 31 in each device 11B amongst some number of the lighting devices 11B illuminating a particular service area of the premises 21.

In the example, at least one of the devices 11B also includes a lighting related sensor 33. Although shown in device 11B for purposes of discussion and illustration, such a sensor may be provided in any of the other lighting devices 11, in addition or as an alternative to deployment of the sensor 33 in a lighting device 11B. Examples of such lighting related sensor 33 include occupancy sensors, device output (level or color characteristic) sensors and ambient light (level or color characteristic) sensors. The sensor 33 may provide a condition input for general lighting control, e.g. to turn on-off devices 11 and/or adjust light source outputs. However, the sensor input information from sensor 33 also or alternatively may be used as another form of user input, for example, to refine detection and tracking operations responsive to signals from the sensors 31.

In an example of a user input related function, the signals from the sensors 31 in lighting devices 11B illuminating a particular room within premises 21 are processed to detect gestures of one or more persons/users within the room. The lighting output from sources 13 of the devices 11 illuminating the area may be controlled responsive to the detection of one or more predetermined user input gestures. Although not shown, one or more of the lighting devices 11B may also include a user output component, for example to provide an audio or video output of information to the person or persons in the room.

Such gesture input together with lighting control and other information output implement a form of interactive user interface. This interface related operation includes selectively controlling a lighting operation of at least some number of the lighting devices as a function of a processed user input. The interface related operation may also include either control a non-lighting-related function as a function of a processed user input, or an operation to obtain and provide information as a response to a user input as an output via the output component.

In the example of system 10, each of the intelligent lighting devices 11C and/or one or more of the lighting devices 11D in one or more rooms or other service areas of the premises 21 support audio input and audio output, for an audio based user interface functionality. These input components may be provided in different lighting devices 11 than those deploying the output elements. Also, audio user interface components may be provided in different devices lighting devices 11 than those deploying the video user interface components. For convenience, the audio input and output components and the video input and output components are shown together in each of the intelligent lighting devices 11C, one or more of which may be deployed with other lighting devices in some number of the services areas within premises 21.

Hence, in the example of FIG. 1A, each intelligent lighting device 11C and/or one or more of the lighting devices 11D includes an audio user input sensor such as a microphone 35. Any type of microphone configured to detect audio user input activity, for example, for speech recognition of verbal commands or the like, may be used; and some other types of sensors may be used if they provide adequate response to audio input. Although the audio output may be provided in different devices 11; in the example, each of the intelligent lighting devices 11C or 11D also includes an audio output component such as one or more speakers 37 configured to provide information output to the user. Where the speaker is provided in the same or a different device 11, there may be a single speaker 37 in each such device 11 or there may be some number of speakers in each respective lighting device 11.

The audio input together with lighting control and audio information output implement a form of interactive user interface. Again, the user interface related operation includes selectively controlling a lighting operation of at least some number of the lighting devices 11 as a function of a processed user input. The interface related operation may also include either control a non-lighting-related function as a function of a processed user input, or an operation to obtain and provide information as a response to a user input as an output via the output component.

Although shown for illustration purposes in the intelligent lighting device 11C, image-based input and/or output components may be provided together or individually in any others of the lighting devices 11 that may be appropriate for a particular installation. Although referred to at times as "video," the image-based input and/or output may utilize still image input or output or may use any appropriate form of motion video input or output. Hence, in the example of system 10, each of several of the intelligent lighting devices 11D in one or more rooms of the premises 21 also supports image input and output for a visual user interface functionality. Although related audio input and audio output could be implemented in other lighting devices, in the example, the devices 11C also have the microphone 35 and the speaker 37 for the audio based user interface functionality outlined above.

For the visual user interface functionality an intelligent lighting device 11C includes at least one camera 41. The camera 41 could be a still image pickup device controlled to capture some number of images per second, or the camera 41 could be video camera. By using a number of cameras 41 to capture images of a given service area, it is possible to process the image data to detect and track user movement in the area, for example, to identify user input gestures. The multiple cameras 41 could be in a single lighting devise 11D or could be provided individually in two or more of the lighting devices that illuminate a particular room or other service area. The image capture may also support identification of particular individuals, e.g. via processing of images for face recognition, and associated customization of gesture recognition and/or user responsive system operations.

The visual output component in the lighting device 11D is a projector 43, such as a pico projector, in this example. The visual output component may take other forms, such as an integral display as part of or in addition to the light source. Returning to the example of FIG. 1A, the projector 43 can present information in a visual format, for example, as a projection on a table or a desk top or a wall or the floor. Although shown in the same device 11D as the camera 41, the projector 43 may be in a different intelligent lighting device 11. Also, the projector may be provided in a device 11 in an area that does not utilize a camera 41 for the user input sensor. For example, the projector 43 may be in a device or in a service area with another device 11 that utilizes a microphone (35) or the like as an audio sensor for spoken user input in an area that may also use sensors such as 31 in one or more devices 11B to detect gestural inputs.

The combination of image-based input together with lighting control and image-based and/or audio information output implement a form of interactive user interface. Again, the user interface related operation includes selectively controlling a lighting operation of at least some number of the lighting devices 11 as a function of a processed user input. The interface related operation may also include either control a non-lighting-related function as a function of a processed user input, or an operation to obtain and provide information as a response to a user input as an output via the output component.

In the example, one or more of the processors 17 in the intelligent lighting devices 11 are configured to process user inputs detected by the user input sensor(s), such as the visual sensors 31, 33, 41, microphone(s) 35 and/or light sensors 33. Of course, other non-contact sensing technologies may be used (e.g. ultrasound) instead of or in combination with the input sensors discussed above. The processing of sensed user inputs may relate to and control operations of the lighting devices 11 in one or more areas of the premises 21. For example, the processing may detect spoken commands and/or relevant gestural inputs from a user to control lighting devices 11 in an area in which the user currently is located, e.g. to turn lights ON/OFF, to raise or lower lighting intensity, to change a color characteristic of any tunable lighting devices 11 and/or various combinations of such changes. As other examples, state changes may include changes of any one or any combination of: distribution shape, spectral content (without changing color), aperture and/or fixture shape/size, fixture aim, color and/or luminance uniformity across fixture output, etc. Changes in light output(s) in response to detected user inputs may also produce a repeating pattern or other sequence of changes in any one or more of the examples or still other lighting related parameters, e.g. so as to convey information or direct attention or to provide a desired variable lighting effect (such as a variable color 'light show' or mood lighting). Changes in the lighting in the occupied area of premises 21 in response to such sensed user inputs would provide the user with a visual cue as part of the interactive user interface functionality. The user inputs also may be processed to control lighting devices 11 serving other areas of the premises 21. In addition to lighting control functions, such as mentioned here by way of example, one or more processors 17 in the intelligent lighting devices 11 may be configured to process user inputs so as to enable the system 10 to obtain and present requested information to a user at the premises 21. By way of an example of such additional operations, the system 10 may also enable use of the lighting devices 11 to form an interactive user interface portal, for access to other resources at the premises 21 (e.g. on users computers in other rooms at the premises) and/or access to outside network resources such as on server 27 or a remote terminal 29 (e.g. via the WAN 25).

Although shown for illustration purposes in the intelligent lighting device 11D, any one or more of the lighting devices 11 may include a sensor 39 for detecting operation of the lighting source 13 within the respective device 11. Such a sensor 39 may sense a temperature of the source 13 or of other component of the device 11D, or a sensor 39 may sense an optical output of the source 13 (e.g. level or color characteristic). The sensor 39 essentially provides feedback as to the state of the source 13 or other component of the device 11D, which may be used as part of the general control of the lighting device(s) 11. By way of an example, where the performance of the source may have an effect on sensing of user inputs, e.g. when a device 11B or 11C in a particular service area optically detects gestures or other visual user inputs, source related feedback from sensor 39 may be used to adjust output of the source 13 in one or more of the devices illuminating the area in a manner intended to assist in the detection of the visual user input (e.g. to ensure adequate illumination for gesture detection).

In a system such as system 10 of FIG. 1, the lighting devices 11 incorporate the elements and provide processing to support an interactive user interface, for example, that need not require the user to touch or otherwise physically contact an element of the system. The user also need not have or operate a separate device, such as a smartphone or other portable terminal device. The lighting devices themselves implement the interactive user interface to the lighting system, and the user interacts with the lighting system via the lighting devices 11.

The system 10, however, may also include or support communications for other elements or devices at the premises 21, some of which may even offer alternative user interface capabilities instead of or in addition to the interactive user interface supported by the lighting devices 11. The above-incorporated related applications, for example, disclose user interface elements of the lighting system that are interconnected to the data communication network of the system. Those applications also disclose standalone sensors of the lighting system that are interconnected to the data communication network of the system, at least some which may perform sensing functions analogous to those of sensors 33 and/or 39 in the system 10.

As disclosed in the above-identified U.S. application Ser. No. 13/964,564, a system similar to the system 10 of FIG. 1 may also support wireless communication to other types of equipment or devices at the premises 21, to allow such other equipment or devices to use the network 23 and/or to communicate with the lighting devices 11. By way of example, present drawing FIG. 1 therefore shows one of the lighting devices including a wireless communication interface 15W, for such a purpose. Although shown in 11B, such an interface 15W may instead or in addition be provided in any of the other lighting devices 11 in the system 10. Of note for purposes of the present discussion of user interface techniques, the wireless link offered by the wireless communication interface 15W allows the system 10 to communicate with other user interface elements at the premises 21 that are not included within lighting devices 11 but which may be used in addition or as a supplement to the lighting device-centric user interface that is otherwise the focus of the present discussion. Although there may be any of a wide range of such other types of user interface elements at any given premises 21, the drawing shows two examples, a remote control 47 as an additional input device and a television or monitor 49 as an additional output device. The wireless link(s) to devices like 47 and 49 may be optical, sonic (e.g. speech), ultrasonic or radio frequency, by way of a few examples.

Any of the various system elements may be implemented using a PC like approach based on any known or available microprocessor architecture, such as a Reduced instruction set computing (RISC) using an ARM architecture, as commonly used today in mobile devices and other portable electronic devices, or a microprocessor architecture more commonly used in computers such as an instruction set architecture (ISA), like those used in Intel microprocessors and the like. The microprocessor based approaches are discussed by way of examples, with respect to FIG. 1B; however, other processor implementations may be used, such as based on a Peripheral Interface Controller (PIC) or other microcontroller architecture. Alternative intelligent architectures for the intelligence of the devices, however, will still include appropriate communication interfaces and couplings for light sources and may include other standardized ports for connections of sensors, user input/output devices, etc.

Turning now to the example of FIG. 1B, the drawing depicts an implementation of an intelligent lighting device 11L using a microprocessor centric architecture. At a high level, the fixture or other type of lighting device includes a light source, a power supply circuit coupled to a power source, a processor, one or more memories and a communication interface; and the device will often include one or more sensors. To act as a portal, the lighting device will also have one or more standard interface ports for attachment of elements for providing the desired type of user interface. Each port may be for a hardwired connection to any compatible accessory or may provide a wireless link (e.g. WiFi, Zigbee or Bluetooth) for the accessory.

As an example of an implementation of the processors 17, discussed above relative to FIG. 1, the more detailed example of the lighting device 11L includes a microprocessor (μP) 123, which serves as the programmable central processing unit (CPU) of the lighting device 11L. The μP 223, for example, may be a type of device similar to microprocessors used in servers, in personal computers or in tablet computers, or in smartphones, or in other general purpose computerized devices. Although the drawing shows a single μP 223, for convenience, the lighting device 11L may use a multi-processor architecture. The μP 223 in the example is of a type configured to communicate data at relatively high speeds via one or more standardized interface buses, represented generally by the bus/arrow 124.

The lighting device 11L includes one or more storage devices, which are accessible by the μP 123 via the bus 124. Although the lighting device 102 could include a hard disk drive or other type of disk drive type storage device, in the example, the device 102 includes one or more memories 125. Typical examples of memories 125 include read only memory (ROM), random access memory (RAM), flash memory and the like. In this example, the memory or memories 225 store executable programming for the μP 123 as well as data for processing by or resulting from processing of the μP 123.

As in earlier examples, the intelligent lighting device 11L includes a light source 13. The source 13 may be such as an existing fixture or other luminaire coupled to the other device components, or the source 13 may be an incorporated source, e.g. as might be used in a new design or installation. The source 13 may be any type of source that is suitable to the illumination application (e.g. task lighting, broad area lighting, object or personnel illumination, information luminance, etc.) desired for the space or area in which the particular device 11L is or will be operated. Although the source 13 in the device 11L may be any suitable type of light source, many such devices will utilize the most modern and efficient sources available, such as solid state light sources, e.g. LED type light sources.

Power is supplied to the light source 13 by an appropriate driver 131. The source driver 131 may be a simple switch controlled by the processor of the device 11L, for example, if the source 13 is an incandescent bulb or the like that can be driven directly from the AC current. Power for the lighting device 11L is provided by a power supply circuit 133 which supplies appropriate voltage(s)/current(s) to the source driver 131 to power the light source 111 as well as to the components of the device 11L. In the example, the power supply circuit 133 receives electricity from alternating current (AC) mains 135, although the lighting device may be driven by a battery or other power source for a particular application. Although not shown, the device 11L may have or connect to a back-up battery or other back-up power source to supply power for some period of time in the event of an interruption of power from the AC mains 135.

The source driver circuit 131 receives a control signal as an input from the processor 123 of the device 11L, to at least turn the source 13 ON/OFF. Depending on the particular type of source 13 and associated driver 131, the processor input may control other characteristics of the source operation, such as dimming of the light output, pulsing of the light output to/from different intensity levels, color characteristics of the light output, etc. If the source and/or driver circuit have the capability, the driver circuit 131 may also provide some information back as to the operation of the light source 13, e.g. to advise the processor 123 of the actual current operating state of the source 13.

The lighting device 11L also includes one or more communication interfaces 141. The communication interfaces at least include an interface configured to provides two way data communication for the μP (and thus for the device 11L) via the network 23. In the example of FIG. 1A, each communication interface 141 is of a type having a bus interface to enable the interface 141 to communicate internally with the μP 123 via the bus 124. The interface 141 that provides the communication link to the data communications network 23 enables the μP 123 to send and receive digital data communications through the particular network 23. As outlined earlier, the network 23 may be wired (e.g. metallic or optical fiber), wireless (e.g. radio frequency or free space optical), sonic or ultrasonic, or a combination of such network technologies; and the interface 141 to that network 23 in a particular installation of the device 11L will correspond to the most advantageous network available (based on considerations such as cost and bandwidth) at the location of the installation. Some devices 11L may include multiple interfaces to the network 11L; and or some devices 11L may include interfaces (analogous to the interface 15W discussed earlier) for communication with other equipment in the vicinity.

A device like 11A in the FIG. 1 example may have just the components of device 11L discussed to this point in our more detailed example. However, for implementations of devices like 11B to 11C in the FIG. 1 example may have one or more user input sensors configured to detect user activity related to user inputs and/or one or more output components configured to provide information output to the user. Although the input and output elements and/or such elements of different types, for convenience, the device 11L shown in FIG. 1B includes both input and output components as well as examples of several types of such components.

In the example, the intelligent lighting device 11L includes a number of optical sensors, including one of more of the sensors 31 configured for detection of intensity of received light and to support associated signal processing to determine direction of incident light. The intelligent lighting device 11L in this example also includes another type light sensor, such as a sensor 33 or 39. Although only one circuit 143 is shown for convenience, the device 11L will include appropriate input/output interfaces to operate and receive signals from the applicable sensors 31, 33 and 39 included in the particular implementation of the device 11L.

A sensor such as 31, 33 or 39 typically includes one or more physical condition detectors, which form the actual device that is responsive to the particular condition to be sensed. The detector(s) may receive a drive signal; and in response to the sensed condition, the detector(s) produces one or more signals having a characteristic (e.g. voltage magnitude, current or frequency) that is directly related to a characteristic level of the sensed condition. A sensor such as 31, 33 or 39 also includes a detector interface circuit that provides any drive signal that may be needed by the particular device type of physical condition detector. The detector interface circuit also processes the output signal from the detector to produce a corresponding output, in a standardized format.

The sensor I/O circuit 143 in turn provides the input and output interface to couple the particular sensor(s) 31, 33 or 39 with the other components of the intelligent lighting device 11L. On the side logically facing the bus and processor, the sensor I/O circuitry 143 in the illustrated architecture provides a bus interface that enables the µP 123 to communicate with the respective I/O interface circuit 143 via the bus 124. The a port for coupling the circuit 143 to the bus 124 may be in accordance with a standard, such as USB. Although not shown, the sensor I/O circuit 143 may fit a standard interface port on the board forming the 'brain' and communication portion of the device 11L; and/or the sensor I/O circuit 143 may provide physical and electrical connections as well as a protocol for the interface with the applicable sensor such as 31, 33 or 39 in accordance with a standard, to allow use of sensors by different manufacturers.

The description of the sensors and I/O circuitry are given by way of example, and actual implementations may use somewhat different arrangements. For example, the detector interface circuit referred to above as part of the sensor may be incorporated in the applicable sensor I/O circuit 143. Each of the circuit(s) 143 may be configured to provide the electrical interface for one, two or more of the respective sensors via the associated coupling(s).

In the example, the intelligent lighting device 11L includes a microphone 35, configured to detect audio user input activity, as well as an audio output component such as one or more speakers 37 configured to provide information output to the user. Although other interfaces may be used, the example utilizes an bus connect audio interface circuit that is or includes and audio coder/decoder (CODEC), as shown at 145. The CODEC 145 converts an audio responsive analog signal from the microphone 35 to a digital format and supplies the digital audio to the µP 123 for processing and/or a memory 125 for storage, via the bus 124. The CODEC 145 also receives digitized audio via the bus 124 and converts the digitized audio to an analog signal which the CODEC 145 outputs to drive the speaker 37. Although not shown, one or more amplifiers may be included to amplify the analog signal from the microphone 35 or the analog signal from the CODEC 145 that drives the speaker 37.

In the example, the intelligent lighting device 11L also includes a camera 41, configured to detect visible user input activity, as well as an image (still or video) output component such as a projector 43, configured to provide information output to the user in a visual format. The lighting device with also include appropriate input signal processing circuitry and video driver circuitry, for example, as show in the form of a video input/output (I/O) circuit 147. The interface(s) to either one or both of the camera 41 and the projector 43 could be analog or digital, depending on the particular type of camera and projector. The video I/O circuit may also provide conversion(s) between image data format(s) used on the bus 124 and by the µP 123 and the data or signal formats used by the camera 41 and the projector 43.

The actual user interface elements, e.g. speaker and/or microphone or camera and/or projector, may be in the lighting device 11L or may be outside the device 11L with some other link to the fixture. If outside the lighting device 11L, the link may be a hard media (wire or fiber) or a wireless media.

The device 11L as discussed above and shown in the drawing includes user interface related components for audio and optical (including image) sensing of user input activities. That intelligent lighting device also includes interface related components for audio and visual output to the user. These capabilities of the device 11L and the system 10 support an interactive user interface through the lighting device(s), for example, to control lighting operations, to control other non-lighting operations at the premises and/or to provide a portal for information access (where the information obtained and provided to the user may come for other equipment at the premises or from network communications with off-premises systems).

For example, the device 11L and/or the system 10 can provide a voice recognition/command type interface via the lighting device and network to obtain information, to access other applications/functions, etc. For example, a user in the lighted space can ask for information such as a stock quote or for a weather forecast for the current or a different location. The user can ask for the system to check his/her calendar and/or the calendar of someone else and can ask the system to schedule a meeting.

In an initial implementation, the speech is detected and digitized in the lighting device 11L and is processed to determine that the lighting device 11L has received a command or a speech inquiry. For an inquiry, the lighting device 11L sends a parsed representation of the speech through the lighting system 10 (and possibly an external network 25) to a server or the like with full speech recognition capability. The server identifies the words in the speech and initiates the appropriate action, for example, to obtain requested information from an appropriate source via the Internet. The server sends the information back to the lighting device 11L (or possibly to another device) with the appropriate output capability, for presentation to the user as an audible or visual output. Any necessary conversion of the information to speech may be done either at the server or in the lighting device, depending on the processing capacity of the lighting device. As the processing capacity of lighting devices increases, some or all of the functions of the server in this example may be shifted into the lighting devices.

The lighting device 11L and the system 10 may provide similar services in response to gestural inputs, detected via sensors 31, one or more cameras 41 or a combination of sensors and cameras. Also, system that include both audio and optical input components can respond to combinations of speech and gestural inputs. Systems that include both audio and video output components can present information to the user(s) in various desirable combinations of audio and image or video outputs.

With an approach like that outlined above, the lighting system may support a broad range of applications or functions often performed via other user terminal devices. For example, the user may be able to post to social media, access social media, send messages via mobile message (e.g. text) or instant messaging or email. The system with the interface portal enables the lighting system/service provider or some other operator of the system 10 to offer other services, such as information access and personal communication. The lighting device may detect when the user enters the area and provide notices to appropriate 'friends' or the like.

The discussion above has outlined the structure and configuration of lighting devices 11 and systems 10 of such devices as well as several techniques for implementing a lighting device-centric interactive user interface that does not require the user physically touch a particular element of the system or require the user to have and operate an additional device. The interactive user interface relies instead on non-contact sensing and appropriate output capabilities integrated into one or more intelligent lighting devices. The user interface could be implemented via processing by as few as one of the lighting devices 11. However, many installations will take advantage of processing by a substantial number of the intelligent lighting devices 11. For complex operations, such as processing of audio or optical inputs to detect speech or gestural user inputs respectively, it may also be advantageous to perform some or all of the relevant processing using a distributed processing technique.

Figure 2:
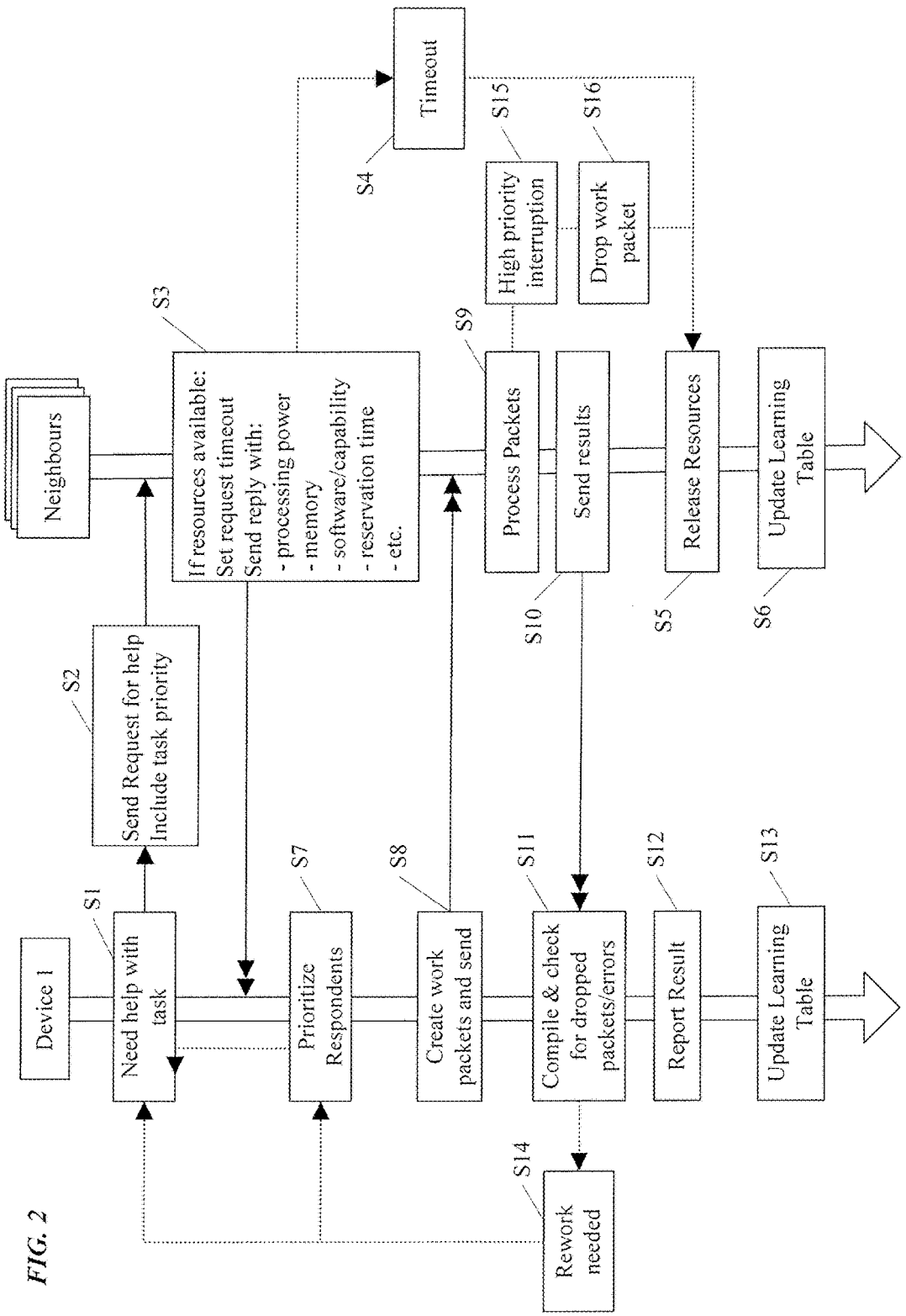
FIG. 2 is a flow chart of a simple example of a procedure for distributed processing, involving resource sharing, which may be implemented in a lighting system like that of FIG. 1 as part of an implementation of an interactive user interface.

A variety of techniques for distributed processing that may be implemented in the context of a lighting system like system 10 of FIG. 1A. Distributed processing, for example, may enable use of available processor and/or memory resources of a number of intelligent system elements to process a particular job relating to user interface interaction via one or more of the lighting devices 11. Another distributed processing approach might entail programming to configure two or more of the intelligent system elements, e.g. lighting devices 11, to implement multiple instances of a server functionality in support of the interactive user interface capability, with respect to client functionalities implemented on intelligent lighting devices. It may be helpful to consider some more specific examples of distributed processing operations. The process flow shown in FIG. 2 represents a simple example of a first type of procedure for distributed processing, which may be implemented in a lighting system like that of FIG. 1A.

In the example, a first lighting system element has a processing job to perform. The element may be any intelligent element of the system 10, although for purposes of a specific example to discuss, we will assume that the element that has the processing job or task is one of the intelligent lighting devices 11 of FIG. 1A, and is therefore identified as device 1 in FIG. 2. At step S1, the device 1 recognizes that it may be prudent to seek help to perform the task at hand, in this case, using resources of others of the intelligent system elements.

The device 1 can perform at least some tasks utilizing the element's own internal processor and memory. For example, a lighting device 11 typically will be able to receive and appropriately process a lighting command, e.g. to set a light level and/or to set an associated color characteristic of the device's light source, to adjust its operational light output as commanded, without the need for resources of other intelligent elements of the system. However, other tasks may more readily lend themselves to resource sharing type distributed processing. Some such tasks with a potential for distributed processing may call for more processing or memory resources than readily available within the lighting device 1 (e.g. without compromising core lighting functions of the device). Tasks with a potential for distributed processing typically will be tasks that can be handled in some reasonable fashion by some number of individual elements, e.g. can be readily split into sub-tasks for processing and/or storage in different elements, although there may be some tasks that by the nature of the processing or storage involved cannot readily be spilt amongst multiple elements. Some tasks may require faster completion than the lighting device 1 alone can provide with only its own resources and therefore best implemented via distributed processing. Conversely some resource intensive tasks may be relatively insensitive to time-to-completion and amenable to wider distribution for processing (e.g. processing of audio, image or video data).

In general, distributed processing tasks may relate to lighting system operations, general processing tasks associated with the system and/or tasks for other parties; although for purposes of this discussion, one or more such tasks relate to the interactive user interface provided by the lighting devices 11 of system 10. Some of these tasks may be implemented by a lighting device 11 operating as a server, whereas other tasks may originate at a device 11 acting individually, e.g. upon its receipt of a particular sensed input. Examples of processing tasks of the system 10 that may be amendable to resource sharing type distributed processing include processing video inputs or processing other optical inputs or audio inputs so as to detect user input activities, either for a lighting control operation in response to user input or for some other system function or feature (e.g. to access information or a non-lighting control function in response to the user audio or video input). Similar distributed processing may apply to a task for an outside party, such as a task that might entail processing sensor, audio or video input data from the system elements for delivery to an outside party, either on a regular basis or in response to a specific request/instruction from the outside party. Similar processing may be handled on a distributed processing basis within the system, to process data that a device 1 receives from outside the system 10.

For purposes of further discussion, we will assume that the task for the resource sharing type distributed processing is a processing task that in some way supports the interactive user interface provided by the intelligent lighting devices. Such processing, for example, may apply to processing of inputs or may involve processing of data or information for output to the user (e.g. decoding or decompressing data).

From the various factors involved in processing the particular task at hand, in the processing flow of FIG. 2, the device 1 will recognize that the task is one that is appropriate for distributed processing, e.g. involving processor or memory intensive operations and/or not time critical, etc. Also, based on characteristics of the job, e.g. source, lighting/non-lighting function, time sensitivity, or the like, the device 1 will assign a relative priority value or level to the particular processing job. The programming and/or the protocols used for signaling between system elements that may be involved in distributed processing in the system 10 can define an appropriate format and range of values for a job priority level parameter.

The lighting device 1 will be in communication with at least some number of other intelligent elements of the lighting system 10, referred to in this process flow example as neighbors of the device 1. The neighbor elements may be other lighting devices 11, or the neighbor elements may be other types of intelligent elements that are part of or communicating via the lighting system 10, such as additional interface devices (not shown) or standalone intelligent sensors (not shown).

At step S2, the lighting device 1 queries other intelligent system elements, i.e. the neighbors in the example, essentially to request help in performing the processing task or job. The queried neighbors may include any number of other elements of the system 10. A small group of neighbors, for example, might be those elements logically associated with the device in some small group or sub-network, such as elements in the same room or other service area sub-network. The queried neighbors may include all system elements on the system 10 or any sub-set of elements between the smallest size group and the complete set. As discussed more later, the sending device 1 may pick and choose which of its 'neighbors' from any particular grouping to query with regard to the current job or task, based on information about element performance learned from earlier distributed processing of other tasks, known capabilities of the other elements and/or requirements for the task at hand.

The exemplary distributed processing procedure includes learning features, for the device that is distributing the job and for the neighbors that respond to queries or requests to contribute resources for distributed job processing and/or that actually contribute their resources to distributed job processing. The learning process on each side of the distributed processing, job sub-task distribution as opposed to offering resources and performing an allocated sub-task, help the various system elements to adapt and optimize the distributed processing operations over time. As will be discussed at various stages of our description of the exemplary processing flow of FIG. 2, information that has been learned from distributed processing of prior jobs informs the various elements in their decisions or responses at various stages of the process. Optimization may also involve some randomization.

For learning purposes, each intelligent system element configured to distribute portions of a task may establish, maintain and store a learning table for the distribution function; and each intelligent system element configured to offer resources to another intelligent system element and if instructed contribute such resources to a distributed processing operation may establish, maintain and store a learning table for such in-bound query response and sub-task processing. Of course, many of the intelligent system elements may play both roles during processing of different jobs over a period of time and may learn about both sides of the distributed processing. An intelligent system element configured to participate on both sides of the distributed processing may maintain learned data about both types/sides of the operations, either in two tables or in a combined table. If separate tables are used, each table may be adjusted in response to a change in the other, under appropriate circumstances.

In general, learning entails analysis of performance by an element and/or by other elements involved in handling of each distributed processing job determine to distributed processing metrics of performance. Examples of learned performance parameters that may be assessed in selecting other neighbor elements during the task distribution include turn-around time or turn-around time per unit of processed data, number or percentage of dropped packets, average amount of memory resources offered (e.g. bytes of storage) and/or amount of processing resources offered (e.g. in units related to data to be processed, number of processing cycles or average processing rate) and/or actually provided, during some number of prior distributed job processing operations. Examples of learned performance parameters that may be assessed in determining how to respond to a new inquiry for distributed processing assistance include amount of data processed, time required, resources used, delay incurred in processing of other tasks, or the like, for tasks distributed by the received device.

In general, the learned distributed processing metrics of performance allows an element to prioritize one or more lists of neighbors/other elements for use in making decisions and selections based on highest relative ranking on the applicable list. For distribution, the device 1 may select some number of the highest ranking neighbors. In contrast, an element offering to take part in a distributed task may choose whether to offer to help or how much if any of that element's resources to offer based on the ranking of the particular requesting device 1, based on learned distributed processing metrics of performance. With such an approach, an element tends to select or respond most favorably to the highest ranked element(s) in the particular prioritized listing, in an effort to optimize operations.

When decisions in the process (e.g. FIG. 2) are made based on the learned performance metrics about other elements, however, the element making the decision can introduce a random variation in the decision, for example, to select or respond to a lighting device or other element that has not or seldom been chosen or favored at the particular decision point in the past. As a result, the element making the selection or response will from time to time randomly select or favor another element that would otherwise appear as less than optimum based solely on the previously learned performance information. However, this allows the selecting or responding element to learn more about the randomly chosen element for future processing purposes and update the parameters in the learned table(s) for optimization of future distributed processing operations. A random variation of this type, for example, may allow the element making the decision to discover changes and adjust its learned information accordingly, for better optimization of future distributed processing operations.

Returning to the process flow of FIG. 2, in a particularly intelligent implementation of the distributed processing, the device with the task to distribute can select among elements in some group or sub-group based on performance data about elements in the group or sub-group learned from prior job distribution operations for sending the query in step S2. The learned performance parameters for job distribution enables the device 1 to prioritize a list of neighbor elements for job distribution and to query some number of the highest priority elements likely to offer and provide sufficient resources to handle the particular task at hand. Only a few may be chosen from the high-end of the priority list for a small task, whereas the sending device 1 may select more or all of the neighbors to query for a larger task. As the process is repeated over time for multiple distributed processing tasks, the device 1 will tend to most often choose the other elements that are rated higher for performance based on the learned performance parameters, for the query step. Lower rated elements will be selected less often. However, the priority for such selection for the query step S2 may change over time as conditions at other elements change and the sending device 1 updates its learned performance metrics accordingly; and the occasional randomization of the neighbor selection can enhance the process of learning about changes.

The device 1 sends the query message through the network media used in the relevant portion(s) of the data communication network 23, of the system 10, installed at the particular premises 21, to the neighbors chosen initially for purposes of the inquiry about the current task processing. The inquiry, for example, may be sent as a broadcast, sent as a multicast to selected neighbors or sent as individual data messages to each of the selected neighbors, depending on the network media and/or data communication protocols utilized by the particular system implementation.

The request message for the query in step S2 will include at least some information about the current job, including the assigned job priority level. The information in the query, for example, may also provide various metrics about the task at hand and/or the sub-tasks thereof being distributed to other elements. For example, such information may indicate the type of processing involved, the type/format of the data to be processed, any time constraints or deadlines for sub-task completion, the overall amount of data or the expected sub-divided amounts of data to be processed by recipient neighbors, or any other parameters about the task that may be helpful in enabling the queried neighbors to determine how to respond to the query. The information about the current job may also include a job or task identifier.

Each queried neighbor element will analyze the information about the job from the query message it receives from the device 1 in comparison to its own resources, current data processing operations, status or the like. For example, the receiving element may compare the priority of the task that is to be distributed to the priority or priories of any of its own tasks in progress or any distributed processing sub-tasks the receiving element may already be working on for other source elements. The receiving element may also analyze factors about the task that is to be distributed, versus what if any of its own resources that element might offer and allocate to the task, in view of its ongoing processing operations and any expected higher priority tasks. For example, if the receiving element is a lighting device 11, that receiving element may be able to offer some resources to handle part of the task but still reserve sufficient resources to address a command to change a light setting if received while working on a part of the task.

Neighbor elements that do not have (or for various reasons will not offer) resources may not respond to the query. Alternatively, such unavailable neighbor elements may send responses, but their responses in such cases would indicate that they are not offering resources to assist in performance of the distributed processing job currently offered by the device 1. In the example, the device 1 will adjust its learned table about its neighbors to reflect any neighbors that do not offer to assist in the distributed processing job, e.g. to indicate other elements did not respond or indicate any reason given in a response declining to participate.

Each receiving element that has resources available will set a request timeout and send a reply message back through the network to the device 1 (S3). This period essentially is a time limit during which the neighbor will wait for further instructions about the job. However, if the timeout period expires (S4) without follow-up instructions about the job from the device 1, then the neighbor will release the promised resources at step S5, in this scenario, without having processed any part of the task at hand. In this way, the unused resources are available for other uses by the neighbor element or for other distributed processing operations. After releasing the resources, the neighbor element will update its learning table about distributed processing offered by other elements, as shown at S6. In the timeout scenario (that passed through S4), for example, the neighbor element will update its learned performance metric information about device 1 to reflect that device 1 did not send a sub-task to the neighbor element after the neighbor offered resources in response to the query. The neighbor element can use such performance metric information in future to adjust its responses to future queries from device 1.

Returning to step S3, as noted, at least the neighbors that have and will offer available resources send back a reply message, which is received at the device 1. Each reply from a lighting device or other element offering to participate in the distributed processing operation will include information about the resources of the neighbor element which that element is offering to make available for sub-task processing of the currently offered job. Examples of such available resource information include: processing power, memory, software/capability, reservation time, etc. Each reply may also indicate the relative priority of any local task or prior distributed processing task that is already in progress on the responding neighbor element. In this step S3, the requesting device 1 will receive similar replies from some number of its neighbors, indicating whether or not the other intelligent system elements have processing or memory resources available for the processing job. In our example, at least some of the replies from neighbors offering available resources provide information about the resources that each other element offering to help in the distributed task processing can make available. In the example, the device 1 will adjust its learned table about its neighbors to reflect those neighbors that offered to assist in the distributed processing job and/or to reflect the resources each such neighbor offered in response to the inquiry sent in step S2.

In step S7, the device 1 with the task to distribute analyzes potential candidates for distributed processing of the task, for example, to prioritize a list of the neighbor elements that responded (respondents, in the drawing). The device 1 can prioritize the respondents based on information contained in the responses, for example, based on information about the resources each is offering and/or priority of any other tasks the respondents are already processing. The device 1 can also prioritize the respondents based on learned information regarding performance metrics of the respondents that the device 1 selected and used to assist in prior distributed processing operations.

The device 1 in our example will also know the priority and requirements of the data processing task that the device 1 is trying to distribute. From the prioritized list created in S7, the device 1 can now select an appropriate number of the respondents starting at the highest rank and working down through the list to select a sufficient number of the respondents to provide the resources to meet the requirements of the particular data processing task.

The device 1 essentially allocates portions of the processing job to the selected respondent elements. Hence, at step S8, the device 1 creates work packets for the selected respondents. By work packets here, we do not necessarily mean IP packets or the like; but instead we are referring to sets of instructions and associated data for the portions of the job that the device 1 allocates to the selected respondents. For large processing jobs, for example, in a system using IP packet communications over the network media, each 'work packet' for a sub-task allocated to a selected respondent may utilize some number of IP packets addressed to the particular respondent neighbor element. The device 1 may send one, two or more work packets to each of the selected respondent neighbor elements. In our example, the distributing device 1 stores a record of each work packet and an identifier of the neighbor element to which the device 1 assigned the particular work packet.

The work packets assigned and/or created for each selected respondent may be tailored to the particular respondent. For example, respondents offering more processing or memory resources may be sent more of the data to process. Respondent elements with particularly advantageous capabilities (e.g. a video processor not currently engaged in another processing task) may receive task assignments particularly suited to their capabilities. The allocations and associated work packet creations also may be adjusted based on the learning table. For example, if a particular respondent has performed better in the past when handling a somewhat smaller data allocation, the device 1 may limit the data allocation for that element accordingly.

In the process flow of FIG. 2, in step S8, the device 1 sends the work packets to the selected respondents through the network communication media of the lighting system 10. Although not shown for convenience, the system elements may be configured to require an acknowledgement of each work packet. In such an arrangement, a neighbor element would send an acknowledgement message back through the network to the distributing device 1. If no acknowledgement is received from a particular neighbor element, after some number of one or more re-tries, the distributing device 1 could select a lower priority neighbor from the list used in step S8 and try sending the undelivered work packet to the alternate neighbor in a similar fashion. Each work packet sent/delivered to a neighbor element will include a portion of the data to be processed for the particular task as well as instructions as to how the data in the work packet is to be processed, essentially to enable each respondent to perform an allocated portion or sub-task of the distributed processing job. Each work packet may include an identifier of the overall processing job and/or an identifier of the particular assigned sub-task.

At this point in the discussion, we will assume that each intelligent system element that receives a work packet for an allocated portion of the distributed processing job will successfully complete and return results for the portion of the job allocated thereto. Several scenarios in which work packets are dropped without sub-task completion will be discussed later.

Hence, at this point in our process flow example, each of the neighbor elements that the device 1 selected for a sub-task receives one or more work packets containing data and instructions for that sub-task as part of the communications in step S8. The element receiving the work packet performs its allocated portion of the processing job on the received data, in accordance with the instructions, using resources of the processor and/or memory of the receiving element of the lighting system (step S9). At step S10, each selected respondent neighbor element sends a result of its sub-task processing back through the data communication network of the system 10 to the device 1. In our example, each of the work result packets sent back to the distributing device 1 includes an address or other identifier of the responding neighbor element that performed the sub-task as well as an identifier of the overall task/job and/or an identifier of the respective sub-task.

Upon sending sub-task results in step S10, each respondent neighbor element will release the resources utilized in processing the sub-task, at step S5. The resources become available again for other uses by the neighbor element or for other distributed processing operations. After releasing the resources, the neighbor element again will update its learning table about distributed processing (at S6), in this case, based on the sub-task processing that the element performed for the device 1. In the completed sub-task scenario, for example, the neighbor will update its learned performance metric information based on analysis of the task of device 1 to reflect the size of the assigned sub-task, the amount of resources and/or time utilized, what if any other tasks of the respondent neighbor element were delayed during this distributed processing operation, or the like. The neighbor element can use such learned performance metric information in future to adjust its responses to future queries from device 1.

Returning to the result transmission step S10, as a result of the transmissions from the neighbors selected back in step S10, the device 1 will receive processing results or the sub-tasks from other intelligent system elements. In step S11 in our example, the device 1 compiles the received results and checks the composite result to determine if any work packets were dropped or if there are any readily apparent errors. Sub-task identifiers and/or a combination of the overall task identifier and the neighbor address/identifier may assist the device 1 in combining sub-task results from the various participating neighbor elements into the appropriate overall composite result. At this point in our discussion, we will assume that no packets were dropped and no errors are detected. Hence, the compiling of the results of the allocated sub-task processing from the other system elements assisting in the current distributed processing operation essentially determines an overall result of the processing job. Processing by the device 1 proceeds to step S12, in which the device 1 reports the overall result. The report function here is given by way of just one example of an action that the device 1 may perform based on the overall result of the processing job. The report may be sent to a higher level processing element or service, e.g. a higher level control service 57 or to an outside system management device 27 or 29. As other examples, reporting the result may involve taking some action in the device 1 and/or in other lighting devices or the like, accessing data via the network 25 and presentation thereof to the user via the appropriate output component, sending a face or voice recognition result to an outside device of another party, etc. Of course, the device or any other system element may act in any of a variety of other ways based on the overall result of the distributed processing operation.

For purposes of discussion here, any number of the different types of reporting or action functions will relate to support for functions of the interactive user interface that the system 10 provides via the intelligent lighting devices 11. At this point, it may be helpful to consider a voice recognition task/job, by way of an example. The device 1, in this case a lighting device such as 11C, 11D or 11L having a microphone input obtains digitized audio data, which the system will process for speech recognition. The work packets sent at S8 include portions of the digitized audio, e.g. sub-divided at apparent speech pauses between words. The neighbor elements process received digital audio data to recognize one or more words in the audio data segments. The returned work result packets represent words of recognized speech. Each returned result may include one or more words, depending on amount of the audio data sent to the respective neighbor element. The device 1 compiles the received words into a string of words in an order corresponding to the original audio stream (prior to division thereof for work packets).

At S12, the device 1 may simply send the string of words to another element in or communicating with the system for further processing or the like. Alternatively, the device 1 may itself perform additional processing, e.g. to analyze the word string to recognize a command, in which case the device 1 can act in response to the command or forward the command to another element in or communicating with the system for further processing or the like.

For example, if the spoken command is a lighting command, the device 1 acting as a controller can then instruct some number of lighting devices to adjust light settings thereof, in the service area where the audio for the spoken command was received as an input, based on the recognized speech command. As another example, if the recognized command is for obtaining access to other information, e.g. a request for a current quotation of the price of a particular stock, the device 1 can format an appropriate query and send that query to a server for a stock service. In response, the device 1 receives data answering the inquiry, from the stock service server. If the lighting device itself has appropriate output capabilities, e.g. a speaker or a projector, the device 1 may provide the appropriate output to the user. Alternatively, the device 1 may send the resulting answer information through the network 23 of the system to 10 a lighting device 11C, 11D or 11L with an audio or display output capability for local presentation in the service area where the audio for the spoken information request command was received as an input.

Returning to the exemplary processing flow of FIG. 2, upon completion of the distributed processing job, e.g. upon reporting the overall result in S12 in our example, the device 1 will also update its learning table (step S13) to reflect the performance of various other system elements with respect to the just completed job. For example, the table may be updated to reflect devices that did or did offer resources in response to the query. The learning table may be updated to reflect successful completion by some of the other/neighbor elements versus packets dropped or errors created by processing of sub-tasks by still others of the neighbor elements. As outlined earlier, the device 1 can utilize the learning table updated in step S13 to improve its neighbor selections (e.g. at steps S1-S2 and steps S7-S8) in future distribution of jobs amongst its neighbors.

If sufficient resources are available and/or enough other elements respond, some or all of the work packets sent out at step S8 may be duplicated and sent to two or more of the selected respondent neighbor elements, for redundant processing. When the device 1 compiles the results at S11, it may receive duplicate sub-task processing results. If the device 1 detects errors, in many cases, at least one of the duplicative sub-task processing results may be successful and free of errors; and the device 1 can utilize the error free results and discard the duplicate version that is subject to errors. In some cases, an element that accepted a sub-task may not respond, at least in a timely fashion. From the perspective of device 1, the work packet sent to such an element has been 'dropped.' However, if another element assigned the same sub-task successfully completes its processing of that sub-task, the device 1 can still compile the overall job result using the successfully completed sub-task result from that other respondent. Hence, duplicative allocation of sub-tasks can improve likelihood of successful completion of the distributed processing task. However, in some cases, problems may still arise. In any of these cases, the update of the learning table in step S13 will reflect such outcomes with respect to the performance metric data stored in the table relative to the respective neighbor elements.

Assume next that when the device 1 checks results in step S11, and device 1 determines that some portion of the job has not been successfully completed. In this situation, the device 1 determines at step S14 that some rework of the job is necessary. If capable, the device 1 may perform any additional processing needed itself. If not, however, then the device can again distribute some or all of the sub-tasks to other system elements. In our illustrated example, depending on the type and/or amount of further data processing required to complete the distributed processing task, processing flows from step S14 back to S1 or S7 and from there through the other steps of the process, essentially as discussed above, to obtain distributed processing results to complete the overall data processing job.

There may be a variety of reasons why a sub-task is not successfully completed, and either the work packet is dropped or the results returned to the device 1 are subject to errors. For example, some communication media may be subject to communication-induced errors too extensive to address with routine error correction technologies. In other cases, some part of the data network of the system 10 may be down or congested. However, in other cases, events at one or more of the selected respondent neighbor elements may result in a dropped work packet, as reflected in our exemplary process flow at steps S15 and S16.

Returning to step S9, the various neighbors that responded, were selected and received work packets are processing data from the packets in accordance with the associated data processing instructions. The overall processing job, and thus the sub-tasks thereof, will have an assigned priority. Other tasks handled by the various intelligent system elements also have assigned priorities. At step S15, one of the system elements that has been processing data from the work packets at S9 now receives (or internally generates) an interrupt in view of an apparent need to perform some other task having a higher priority than the particular distributed processing job. That element will suspend its processing of the allocated sub-task and perform the processing for the higher priority task. Depending on the resources and time taken for the higher priority task, the element may be able to resume sub-task processing after completing processing for the higher priority task and still deliver its sub-task results within the timeframe set for the particular distributed processing job. If not, however, then the system element will drop the processing of the work packet of the particular distributed processing job (step S16), to process the higher priority task. In this later situation, the element will release the promised resources at step S5. After releasing the resources, the neighbor element will update its learning table about distributed processing offered by other elements, as shown at S6. In the interrupt scenario (that passed through S15), for example, the neighbor will update its learned performance metric information about device 1 to reflect that the respondent neighbor element was unable to complete the sub-task before dropping the packet to handle the interrupt for a higher priority task.

Although not discussed in detail, the device 1 may also process some portion data or otherwise perform some sub-task of the distributed job before compiling the results. Alternatively, the device 1 itself may be involved as a respondent neighbor in another distributed processing operation while it waits for responses from the respondent neighbors in the job the device 1 distributed.

Although the discussion of FIG. 2 mainly focused on distributed processing amongst lighting devices 11, as noted earlier, the resource sharing implemented by a process flow like the example of FIG. 2 may take advantage of and share resources of any other type(s) of intelligent elements that are part of or communicating via the lighting system 10. For example, if provided, the resource sharing type distributed processing procedure may utilize resources of any additional user interface devices and/or standalone sensor devices. As another example, the lighting system 10 may be able to use the memory and/or one or more processors of a cooperative laptop, desktop computer, host/server computer or the like that is coupled to communicate via the data communication media of the lighting system 10. The system also may support communications and/or interactions with a wide range of other devices within the premises 21 having some level of intelligence and having appropriate data communication capabilities, e.g. HVAC components, smart appliances, etc. If any of such other devices have resources to share and are appropriately programmed, the lighting system 10 may be able to use the memories and/or processors of such other cooperative devices. Conversely, some other types of lighting system elements, computers coupled to the communication media and/or some other types of cooperative devices may be able (and permitted if appropriate) to request and obtain access to resources of the lighting devices, associated user interface devices and sensor devices available for sharing for distributed processing in a manner like that shown by way of example in FIG. 2.

In a system like that shown in FIG. 1, some functions may be implemented in the form of servers, for example, for central control, CO functions in support of system commissioning and/or for central connectivity to outside networks and equipment. Of note, some aspects of the user interface provided by the system 10 through the intelligent lighting devices 11 may involve serve functions and related client-server communications. Some or all of the intelligent lighting devices (and possibly some other intelligent system elements) may have sufficient capabilities to be able to run appropriate server programming in addition to performing other processing tasks for the normal functions of such elements. For example, one or more lighting devices 11A may be configured to operate as a server for overall control of a particular system function and/or for information access purposes, in addition to operating as a lighting device. To the extent that a server task for such a centralized service is amenable to resource sharing type distributed processing, the lighting device 11A also configured as a server may distribute the server processing task to other elements, in essentially the manner described above relative to FIG. 2. Lighting devices 11A are identified here for performing the server functions, since in the example of FIG. 1A, those devices 11A did not include any of the user input/output components and thus did not directly processing user inputs or information for output to the user. Any or all of the other types of lighting devices 11B, 11C, 11D or 11L, however, may run the appropriate server programming.

Hence, the system 10 may implement another form of distributed processing with respect to server functionality, instead of or in addition to the resource sharing approach outlined above relative to FIG. 2. Some or all of these server functions may have interactive user interface implications, e.g. in deciding how to change light settings in response to gestural or speech inputs, obtaining and processing requested information for presentation to a user, etc.

A single instance of a server running on one system element may at times be stressed by high processing demands. Also, a system that utilizes a single server instance for a crucial system function or service may be vulnerable to interruptions, e.g. if there is a failure of the element or of communication with the element running the server instance. To address such possible concerns, a system 10 can run some number of separate instances of a particular server functionality, in parallel with one another on multiple intelligent system elements. Also, different server functions may run on different system elements.

For a particular function, each server instance would utilize a copy of the relevant server programming and a copy of any data or database needed for the particular system service. Use of multiple instances of the servers may also speed up response time when interacting with clients implemented on the other system elements.

Figure 3:
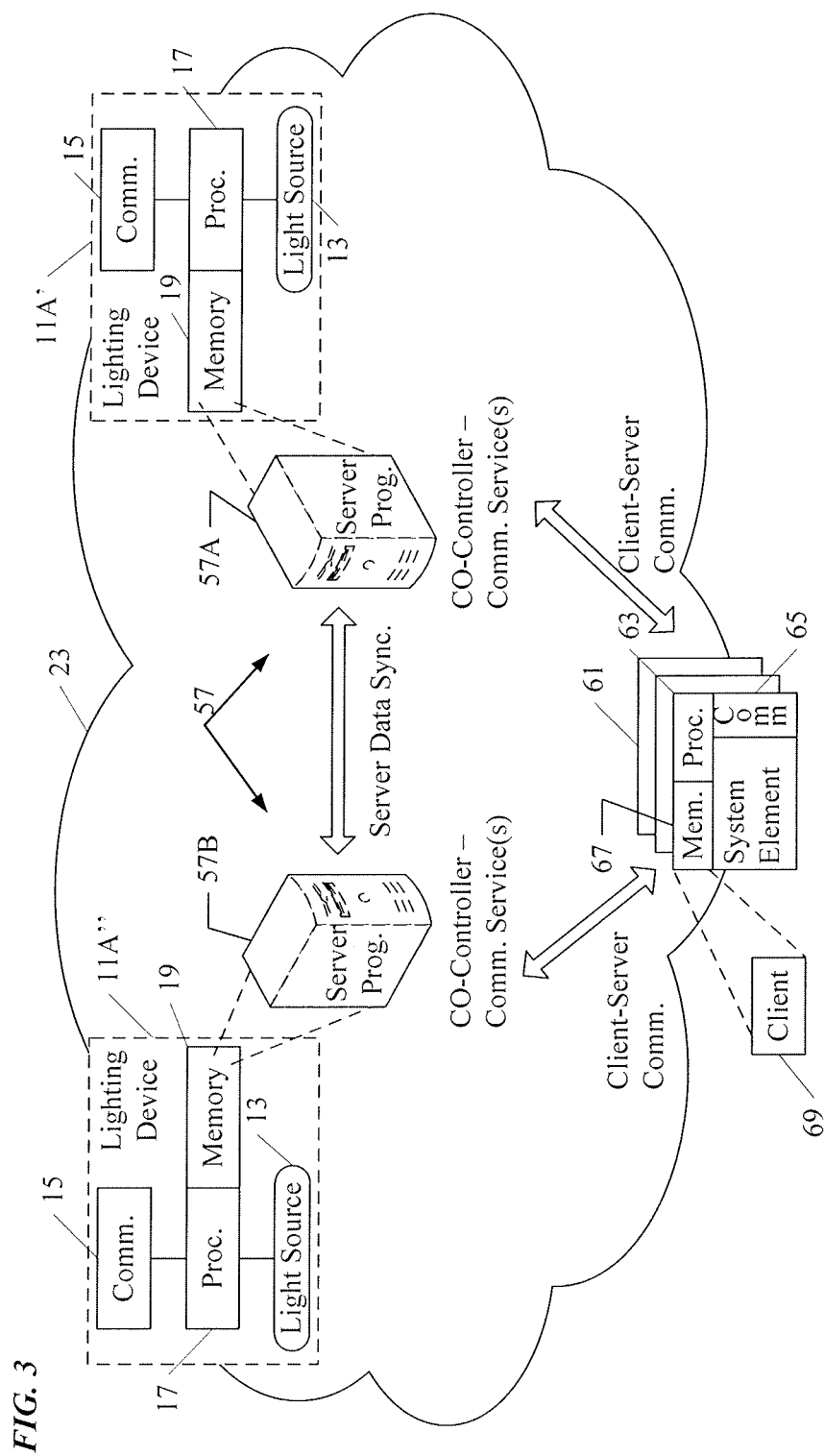
FIG. 3 is an alternative diagram of selected aspects of the system of FIG. 1, representing an example of multiple-instance server type of distributed processing.

To the extent that data used by the server functionality may change over time of operation of the system 10, the sever instances would coordinate with each other to update the copy of the data/database at or used by each instance of the server, e.g. to maintain synchronism as between multiple instances of the relevant data. FIG. 3 is a simplified illustration of such an arrangement. Alternatively, the data used by the server functionality may be stored in a distributed manner across multiple elements (e.g. as distributed hash tables) to minimize the synchronization operations.

For discussion purposes, the drawing shows two of the lighting devices 11A, there identified in FIG. 3 as devices 11A' and 11A". The devices may include elements 13 to 19, as in devices 11 of FIG. 1; therefore the same reference numbers are used in FIG. 3 and detailed discussion of those elements is omitted here for convenience. The two intelligent lighting devices 11A' and 11A" implement a user interface related server functionality 57. The server 57 in turn communicates through the network 23 with other elements of the system acting as client devices; and the drawing depicts the other/client element generically as the elements 61 in this drawing. At least for most of the interactive user interface functions under consideration here, most if not all of the other system elements 61 will be other lighting devices, although there may be some other types of intelligent system elements acting as clients, particularly for some functions that do not directly impact the interactive user interface offered through the lighting devices.

Hence, in the example, two of the lighting devices 11A' and 11A" run instances 57A and 57B of server programming for execution by processors 17 thereof. The server instances 57A, 57B configure those lighting devices 11A' and 11A" to operate in a distributed processing fashion to implement a server function 57 with respect to an overall user interface functionality of the system 10 and to implement related server communications via the data communication network, generally represented again by the cloud 23. The server program instances 57A, 57B are represented generally by icons similar to hardware devices such as server computers; but the program instances 57A, 57B are actually server programming stored in memories 19 for execution by the processors 17 (hence, the servers 57A, 57B are shown in dotted line form). Although only two instances of the server program are shown, there may be any appropriate number of such instances for implementation of a particular function or service in a system of a particular size and/or complexity.

At least with respect to the particular overall processing function of the system 10 supported by the server program instances 57A, 57B, the server program instances 57A, 57B interact with some number of other intelligent system elements represented generically by the boxes at 61. The other elements can be any of the types of intelligent system elements discussed above and will include at least a processor 63, a memory 65 and a communication interface, which may be similar to components of the intelligent system elements discussed with regard to the earlier drawings.

As shown in FIG. 3, various other intelligent system elements 61 will include client programming stored in memories 67 thereof for execution by the processors 63 of the other intelligent system elements 61, to configure each of the other intelligent system elements 61 to implement a client function with respect to the overall processing functionality of the system supported by the server instances 57A, 57B. The client programming 69 will also support related client communications with the server function implemented by the instances of the server programming 57A, 57B on the lighting devices 11A' and 11A" in our example. Hence, the drawing shows arrows through the network for client-server communications between the server instances 57A, 57B and the clients 69 at the intelligent system elements 61

In a multi-instance server implementation such as shown in FIG. 3, any one server may be able to perform on its own to handle client-server interactions with one or more elements 61 independently of the other server instance(s), while each the other server instance(s) independently handles other client-server interactions. To the extent that they relate to the same overall system function, however, they will often use or process some of the same data. For example, if a particular overall processing functionality of the system involves a database, all of the relevant server instances will manipulate that same database. In our two instance server example, to insure that both instances of the server programming 57A, 57B have access to the same state of the database if or when necessary, the server instances 57A, 57B will communicate with each other through the data communication network 23 to synchronize any separate copies of the database maintained by or for the individual server instances 57A, 57B, as represented by the Sync arrow between the server instances 57A, 57B. Any appropriate data synchronizing technique may be used.

The use of multiple server instances allows for server load distribution across multiple hardware platforms of intelligent elements of the system. The use of multiple server instances may also provide redundancy in the event of impairment or failure of a system element or communications to an element executing one of the server instances. Various load distribution and/or fail-over techniques may be used.

The network features of the system may be sufficiently intelligent to detect each new device and negotiate communication rights. In addition, it may be advantageous to provide a relatively 'open' software architecture, e.g. so that the system supports a standard application program interface (API) at least for network interface/communications. With such an approach, application developers can draft different applications for the lighting system elements, for implementing/utilizing the user interface and/or for other smart devices in the premises.

To further appreciate the relationships and interactions, it may be helpful to consider logical relationships or stacks as may be involved in programming and/or communications. A telecommunications protocol stack may be logically considered as having as many as seven layers. A software stack may have fewer layers, for example a physical layer for device drivers or the like, and operating system (OS) with one or more application programming interfaces (APIs) for higher layer applications. In the telecommunication stack, the OS and above are all part of the 'application' layer.

Figure 3A:
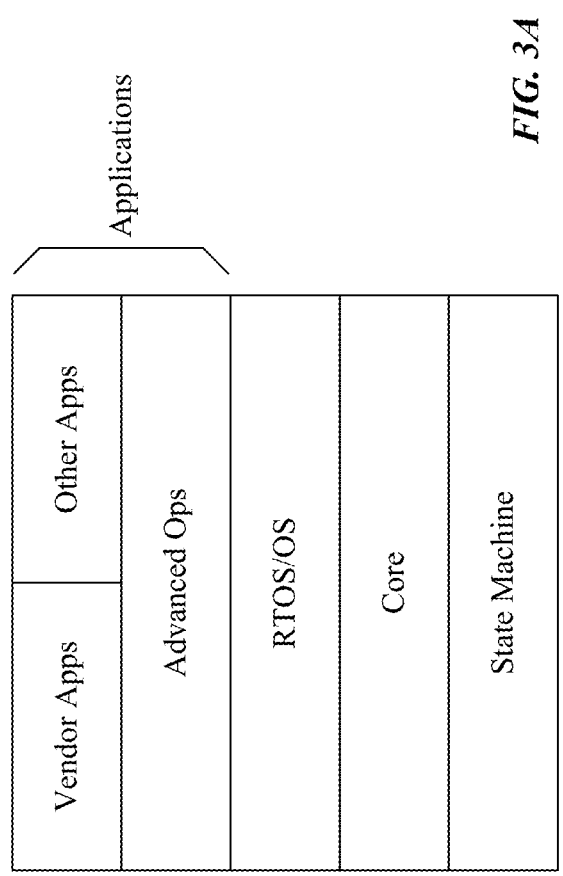
FIG. 3A is a stack diagram useful in explaining an example of program configuration.

FIG. 3A is a logical diagram of a program stack, for programming which may be used in intelligent system elements for an implementation of a lighting system such as that discussed above relative to FIGS. 1 and 3. A similar logical stack, or at least elements thereof, may be implemented in other intelligent system elements 61, particularly those that will communicate with server functionality provided by the intelligent lighting devices 11A' and 11A".

At its most basic level, a processor may be considered or modeled as a state machine, as shown at the lowest layer of the stack in FIG. 3A. In its simplest form, a state machine will switch between states in response to different sets of signals or values on its inputs. Core processing functions may be just above but near to the state machine level. The core function layer, for example, may implement the driver and/or interface functions for converting between the inputs and outputs of the state machine and the signals produced by or used to drive any input and/or output components of the intelligent system element. The core functions also provide a program interface between the state machine and the higher level programming.

Logically speaking, several layers of software programming run on top of the state machine and core processor functions, in our example. The next highest layer may be a real-time operating system (RTOS) configured to service real-time application requests or interrupts, or the next layer may be a more computer-like operating system (OS). The top two layers in the exemplary stack represent applications running on top of and thus through the operating system layer. Part or a sub-layer at the applications level of the exemplary stack is for applications for advanced operations (Ops). Resource sharing type distributed processing may be implemented via an advanced ops program application. Client programs 89, 91 and server programs 81C, 81D are additional examples of application layer programs.

The top layer of the software stack is a general application layer. Any of a wide variety of applications may reside and run at this layer of the logical program stack. The CO/controller services and the responsive operations of the system elements may be implemented at the application layer. Similarly, server functionality supporting the client operations of the processors of the non-lighting device 19 may be implemented at the application layer. Hence, the top layer in our example includes some applications by or controlled by the system vendor, for example, to support system services that the vendor designs the system to provide. For example, the vendor application layer may include the client programming 69 and/or a server instance 57A or 57B for a particular CO, controller or communication service of the system 10 and/or for a server function consumed by client programming 69.

For some purposes, the software protocol stack and aspects of the programming/configuration at various layers are defined and secured by the system manufacturer. It is envisioned that the system 10 will be open to third party application and/or device developers. In an open system, third parties will be able to build devices that utilize the system and its protocols for operation including interactions with elements provided by the system manufacturer. In such a system, the system manufacturer may opt to allow third parties some access to program or otherwise interact at various layers of the stack, for example, to allow third parties to manufacturer and sell other system elements or client devices 61 for use on the system 10 and/or to allow third parties to write client and server applications for the system. Hence, the highest layer in our example also may include applications (Apps) by other providers, for example, third party software developers. Manufacturers of other system elements and/or other non-lighting-system devices intended for operation on or through the system are allowed to write application layer programming for their own server functions and associated client functions, to allow the system vendor's elements to interact with elements on the system developed by other vendors.

The discussion of FIG. 3A focused on the software architecture. The open approach to the system configuration, however, may also extend to the protocols utilized for communications. To provide a framework for this part of our discussion, it may help to consider a model of a protocol stack. The Open Systems Interconnection (OSI) model defines a seven layer-stack. The OSI reference model is not itself a network architecture. Rather it specifies a hierarchy of protocol layers and defines the function of each layer in the network.

As a logical matter, operations or functions at each layer performed on one device communicate only with the functions at that layer performed on another device, in accordance with a protocol defining the rules of this communication. However, to achieve such communication across a network, the operations or functions at the layer transfer information down from layer to layer in one through the lower layers of the stack on the device, then through the channel medium of the network, and up from layer to layer of the lower layers on the other device to reach and communicate with the same layer on the other device. With this approach, it is easy to consider each of the layers as communicating with its counterpart at the same level, in a "horizontal" direction, for purposes of design of the various layers and understanding their functions.

The bottom layer of the OSI stack model is the physical communication layer, which deals with physical and electrical aspects of the protocol. The physical communication layer provides transmission of raw data bits over the physical communication channel through the particular network. On top of the physical layer, the next layer is the data link layer, which provides services to enable transfer of data between network entities via the media used at the physical layer. The data link layer transforms the physical layer, which interfaces directly with the channel medium, into a communication link that appears error-free to the next layer above. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) sublayer. This sublayer determines which station should get access to the communication channel when there are conflicting requests for access. The functions of the MAC layer are more likely to be dependent on the nature of the transmission medium.

In the system 10, the interfaces to network 23 in the various communication interface systems of elements 11A' and 11A" will implement physical and data link layer protocols that correspond to the technology adopted for the system's data network 23.

On top of the data link layer, the next layer is the network layer, facilitates the transfer of data to a host on another network while maintaining a desired level of quality of service. The network layer provides capabilities required to control connections between end systems through the network, e.g., set-up and tear-down of connections. Internet Protocol (IP), for example, may be implemented in the network layer of the OSI model. An IP address therefore is associated with protocol services at the network layer.

On top of the network layer, the OSI model specifies a transport layer protocol, which provides reliable control of data transfer between end systems. The transport layer, for example, may provide error control, flow control and/or data segmentation. TCP (Transmission Control Protocol) and UDP (User Datagram Protocol) typically run at the transport layer on top of network layer IP.

Above the transport layer, a session layer is responsible for establishing and managing communication sessions between presentation entities, that is to say between entities operating at the next higher layer of the protocol stack. For example, the session layer determines which entity communicates at a given time and establishes any necessary synchronization between the entities. Above the session layer, a presentation layer serves to represent information transferred between applications in a manner that preserves its meaning (semantics) while resolving differences in the actual representation (syntax).

A protocol that is specific to the actual application that utilizes the information communicated runs at the top of the protocol stack. Hence, the top layer of the stack is referred to as the application layer. However, it should be noted that the application layer for telecommunications purposes includes concepts other than the top layer applications of the software stack. For example, the operating system (OS) and all programming running on or above the OS in the software stack are all part of the 'application' layer of the telecommunications stack.

In actual system implementations, two or more of the layers of the communication stack may be combined into functions of a smaller number of layers or into just one layer.

It is envisioned that the system manufacturer will likely specify (and secure) some particular application layer functions, for example, for basic system operations and maintenance; and such an arrangement will limit the configuration that is stored for that portion of the application layer.

However, as discussed relative to FIG. 3A, it is also envisioned that the system 10 will be open to third party application and/or device developers. Third parties will be able to build client devices 61 or alternative system elements that utilize the system and its protocols for operation including interactions with elements provided by the system manufacturer.

The open approach, for example, may also enable a customer that will own or occupy a particular premises having a system 10 to purchase and install third party devices for lighting devices, lighting system controller or lighting related sensors and/or to purchase additional programming for desired functions different from (or possibly competing with) those offered by the system manufacturer. The open approach also allows a wide range of third parties to develop non-lighting-system elements that communicate through and possibly interact with the elements 11A' and 11A" of the lighting system 10 and to develop a wide variety of application programming for those devices and/or any associated server functionalities or the like intended to run on the system elements 11A' and 11A".

The degree of third party access to the layers of the program or telecommunication protocol stacks may vary amongst third party vendors. A trusted or 'certified partner' may have access to more layers, whereas non-certified third parties may only be allowed to connect to the media and write application layer programming that otherwise conforms to the application layer programming interfaces to the lower layers of the stack.

Users of different types may also be granted access to different amounts of the stacks, particularly the program stack. For example, a government entity with a high degree of sophistication and a need for security may have greater access to control its system, whereas a small business enterprise may only be allowed access to adjust its system operations at the application level.

Many of the intelligent functions of the lighting system elements discussed above can often be performed using the processing and memory resources of one involved system element. A lighting device 11, for example, can receive, process and respond to a command from a user interface device 11 by appropriately adjusting the output of the light source 13 of the particular device 11. The server functionality may be executed in a single intelligent lighting system element. The exemplary system 10, however, implements distributed processing. One type of distributed processing is the use of multiple instances of a server functionality 57A,57B.

Even where implemented on a distributed processing basis, by multiple instances of the server 57A,57B, processing at one element may be sufficient to complete a particular processing operation for serving a client request.

However, the system 10 at the premises 21 may implement an additional or alternative form of distributed processing involving a processing and/or memory resource sharing functionality. Resource sharing involves an element with a processing job asking for and obtaining help from other system elements. Some processing operations of one or more of the elements of the system 10 may require more processing resources or memory resources than are available at a particular lighting system element. The system 10 therefore may be configured to support any such operation that may be more resource intensive via the resource sharing. The system may implement resource sharing for lighting system operations, e.g. to process complex sensor data at one element or across a large premises and determine how one or more of the system elements should respond thereto. The system may also implement resource sharing in support of server operations. To the extent that a server task for a centralized service is amenable to distributed processing, the system element that also is configured as the server may distribute the server processing task to other elements. The resource sharing in support of server operations may apply to lighting system related functions, e.g. to process audio or optical inputs through system elements 11A' and 11A" to recognize and respond to user commands to control lighting or the like.

Figure 4:
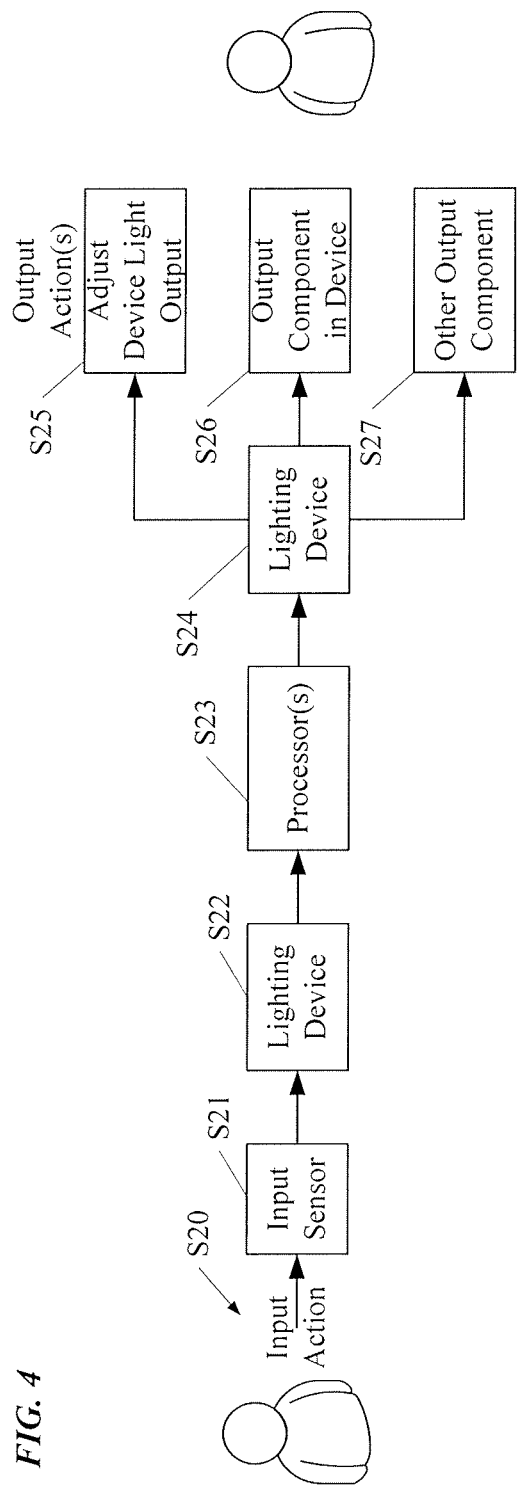
FIG. 4 is a simplified process flow diagram illustrating an example of an interactive user interface procedure, where the interactive user interface is provided via the intelligent lighting devices.

FIG. 4 illustrates an example of an interactive user interface procedure, where the interactive user interface is provided via the intelligent lighting devices, which may be implemented in the system 10 and may involve one or more of the distributed processing techniques discussed above. In this example, a user takes an action (at S20) that represents an input. The action, for example, may involve speech, a gesture or a combination of speech and gestural inputs. As outlined in the discussions of FIGS. 1A and 1B above, one or more of the intelligent lighting devices 11 includes a user input sensor; and at step S21, such a sensor detects the user activity as an input to the lighting device (S22) that includes the particular sensor.

In step S23 the processor(s) of one or more of the intelligent lighting devices 11 process the signal or data from the sensor(s) representing the detected user input to determine the appropriate response to be presented via the interactive user interface. In some cases, the processing may be done by the processor of the lighting device that detected the input and/or by a lighting device acting as a server. In other cases, the processing may involve processors of any number of lighting devices, e.g. using a resource sharing type distributed processing technique or a combination of processor operations in the client lighting device and a server lighting device.

Upon completion of the processing, a determination is made as to how to respond and the decision is implemented by one or more of the lighting devices at S24. This may be the same lighting device that detected the input in steps S21 and S22 or the output-side operation at S24 may be at one or more other lighting devices instead or in addition to the lighting device that detected the input in steps S21 and S22.

Steps S25 to S27 represent different types of outputs to the user, some of which may be implemented in the lighting device that detected the user input and others of which may be implemented in devices other than the lighting device that detected the user input. As discussed above, the user interface implemented by the lighting devices 11 can control lighting and control information output to a user via other output component(s). As shown at S25, each lighting device or devices (discussed re S24) intended to respond to the detected user input adjusts its light output based on the processing of the detected user input action. As shown at S26, one or more lighting devices having an appropriate information output component (e.g. speaker for audio output and/or projector or display for image output) operates that information output component to present information to the user. For example, the information may inform the user of the response (e.g. change in light setting) or any error or problem encountered attempting to respond, or the information may be information obtained from some other source as directed or requested by the user via the input activity. If the system 10 includes other controlled components, the appropriate lighting device(s) activate one or more such components as the response to the user.

Figure 5:
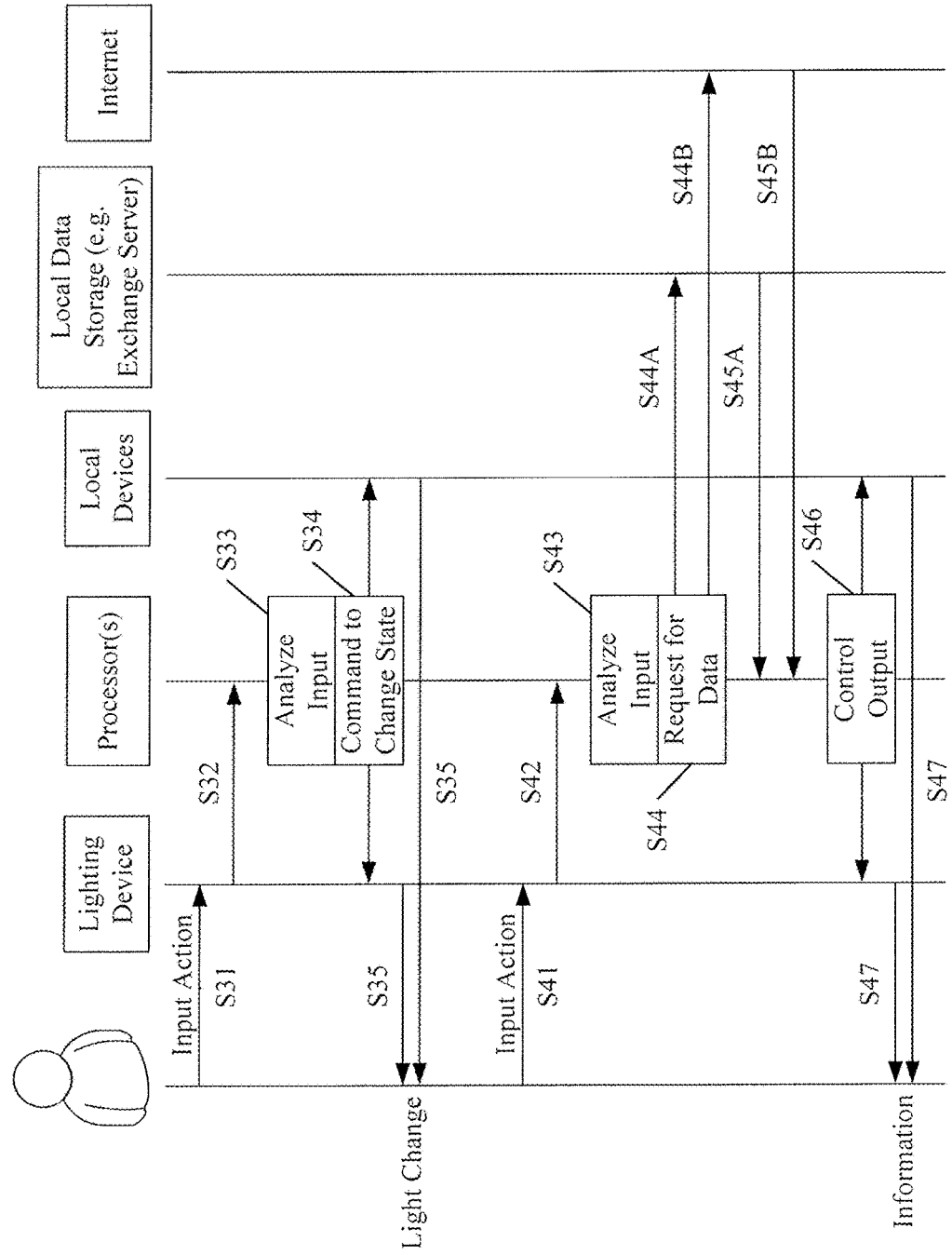
FIG. 5 is signal flow diagram providing an alternative form of illustration of two examples of process flows for the interactive user interface provided via the intelligent lighting devices.

FIG. 5 shows aspects of two procedures, each similar to that of FIG. 4, but in a signal flow format. In a first example shown by that drawing, a user takes an action (at S31) that represents an input. As noted above, the action may involve speech, a gesture or a combination of speech and gestural inputs. As outlined in the discussions of FIGS. 1A and 1B above, one or more of the intelligent lighting devices 11 includes a user input sensor that detects the user activity as an input to the lighting device that includes the particular sensor. The signal or data from the sensor(s) that detect the user input is provided to the processor(s) of one or more of the intelligent lighting devices in step S32.

The processor(s) of the one or more of the intelligent lighting devices process the signal or data representing the detected user input to determine the appropriate response to be presented via the interactive user interface (S33). At this point in the example of FIG. 5, we will assume that the input action from the user at S31 related to a desired lighting change; therefore the processor(s) determine the appropriate change as a result of the analysis in step S33. Hence, at step S34, the processor(s) provide instructions to one or more lighting devices to implement the appropriate change. Although the lighting change may apply to only the lighting device that detected the user input or only in one other device in the system; in our example, the processor(s) instruct the lighting device that detected the user input and some number of other local lighting devices to make the change, e.g. to appropriately change an aspect of the overall illumination of the room or other service area within which the user made the input in a relatively steady state manner or in a specified manner that changes over time. At step S35, those lighting devices change their light outputs as instructed, which provides a lighting change output as the system response to the user input to complete this first FIG. 5 example of user interface interaction with the lighting system.

FIG. 5 also shows a second example of a user interface operation involving an information output responsive to the user input. In this second example, the same or a different user takes an action (at S41) that represents an input. As will be seen in later steps, a response to this second user input via the interactive interface will lead to an information output (which may be instead of or in addition to a lighting change). Again, for discussion purposes, the user activity may involve speech, a gesture or a combination of speech and gestural inputs. As outlined in the discussions of FIGS. 1A and 1B above, one or more of the intelligent lighting devices 11 includes a user input sensor that detects the user activity as an input to the lighting device that includes the particular sensor. The signal or data from the sensor(s) that detect the user input is provided to the processor(s) of one or more of the intelligent lighting devices in step S42.

The processor(s) of the one or more of the intelligent lighting devices process the signal or data representing the detected user input to determine the appropriate response to be presented via the interactive user interface (S43). At this point in the second example of FIG. 5, the processor(s) determine that a response will involve information to be obtained from other equipment. The information may be virtually any type of information that the user may desire or that the system may otherwise offer to as a response to the user. Although the information may come from one or more of the lighting devices, it is also envisioned that the information may be obtained from other sources.

In the illustrated example, the information may come from a device implementing a 'local' data storage, such as a computer of the enterprise or other occupant at the premises 21 or equipment at another associated premises in communication with or via network 23. An example of such a data source might be an exchange server of the enterprise that operates its business or the like at the premises 23. Alternatively, the information might be available on any web site server or the like accessible via the public Internet.

If the analysis in step S43 determines that the information is on the local data storage device, then the processor(s) send a request for the desired data to that storage device in S44A. The device in turn sends back responsive data (e.g. requested information or an error message if not available) from the local storage in step S45B. Alternatively, if the analysis in step S43 determines that the information is available through the Internet, then the processor(s) send a request for the desired data, via the Internet, to the appropriate server or the like that has the data. The processor(s) in turn receive responsive data (e.g. requested information or an error message if not available) via the Internet, in step S45B. Although shown as alternatives, the local and Internet requests/responses may be used in a combined procedure, e.g. to request data from the Internet source in the event that a response from the local storage indicates that some or all of the requested information data is not locally available.

In these examples, after step 45A or 45B, the processor(s) have data for providing an information output responsive to the user's latest input activity. Hence, at step S46, the processor(s) supply data in appropriate format(s) and any related instructions that may be required to enable particular lighting device(s) to control components thereof and thereby output the responsive information to the user. Depending on the deployment of the output components in various lighting devices, the information may go back to only the lighting device that detected the user input or only to another lighting device of the system in the same or a different service area than the lighting device that detected the user input. With some types of deployments, the same data or related portions of the data may go to the same device that detected the input and other local devices. The drawing generally shows the various options for distribution of the received information as arrows from step S46 to both the lighting device that detected the user input and to other local lighting devices. By way of an example involving multiple devices as art of a response to one particular input, a device that detected an audio input may also provide an audio output of some portion of the information, while another device in the vicinity outputs some portion of the information in a visible format. Light output by one or more of the lighting devices also may be controlled in some manner related to the information output. Hence, at step S47, each lighting device that receives some or all of the responsive information controls one or more components thereof to output the information as instructed, which provides the information output as the system response to the user input to complete this second FIG. 5 example of user interface interaction with the lighting system.

Figure 6:
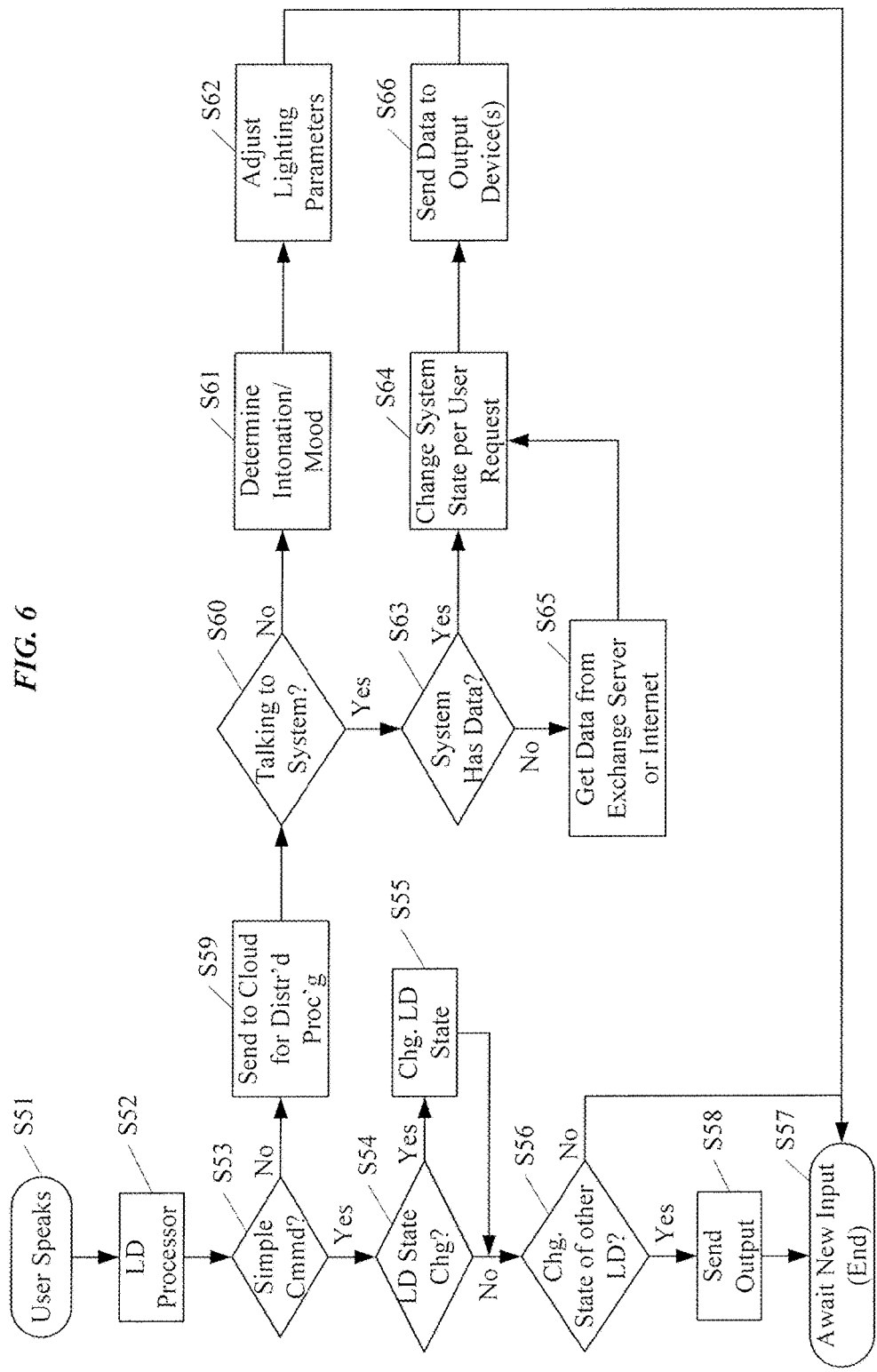
FIG. 6 is a flow chart another example of an interactive user interface procedure.

FIG. 6 is a flow chart of an interactive user interface procedure, specifically one involving speech input and recognition. For convenience, the lighting devices are referred to in the illustrations of the steps in this drawing using the acronym LD.

In this example, a user speaks, as an input activity shown at step S51. As outlined in the discussions of FIGS. 1A and 1B above, one or more of the intelligent lighting devices 11 includes a microphone or other audio input sensor that detects the user's spoken input activity as an audio input to the lighting device that includes the particular sensor. The signal or data from the audio sensor(s) is provided to the processor of the lighting device (LD) that includes the sensor(s), and that processor performs at least some initial processing in response to the detected audio in step S52.

All of the speech recognition could be implemented via distributed processing, in which case, the processor of the device would digitize and possibly compress the audio and send the resulting digitized representation of the audio input to one or more processors for implementation of distributed processing, to recognize the speech and to determine further system action. In this example, however, the particular lighting device (LD) has some basic speech recognition capability. Hence, as a result of the processing in S52, the processor of the particular lighting device (LD) determines in step S53 whether or not the audio input represents a simple spoken command that the device (LD) can handle. If the audio input represents a simple command, then the processor of the particular lighting device (LD) follows the 'Yes' branch from S53, and processing flows to step S54.

At S54, the processor of the lighting device (LD) determines whether or not the command dictates a change of state of the output from the light source within that particular lighting device (LD). If so, the process branches from step S54 to step S55, in which the processor makes the appropriate state change within the lighting device so that the light source of the device provides the appropriate light output responsive to the user's spoken input command. If the determination at S54 is that change of light state within the particular lighting device (LD) is not appropriate for the system response to the user's spoken simple input command (e.g. because the lighting device itself is already in the appropriate state or the command was directed to one or more other lighting devices), then the process flow skips step S55 and branches to step S56.

To this point in the example of FIG. 6, the processing functions and the decisions have all been made by the processor of the one lighting device (LD) that received the audio input. At step S56, the processor of that lighting device (LD) determines whether or not the command dictates a change of state of the output from the light source within any other lighting device (LD) of the system 10. If the receiving device includes a table or the like indicating lighting states of the other devices, then the determination in S56 may be also be internal to the lighting device that received the audio input. In many implementations, however, the determination may involve some communication with and/or processing by one or more other elements of the system 10. For example, the receiving device may query other devices and determine necessary state changes if any by processing state information received from the other devices. Alternatively, the receiving device may work with an appropriate server implemented on the system (e.g. as in FIG. 3) to identify other devices and the appropriate change if any that should be made in the light output states of other lighting devices.

In one of these ways, a determination is made at step S56 as to whether or not lighting state change is needed at any other lighting device of the system. If not, processing skips from S56 to S57 in which the lighting device that received the audio user input awaits a new user input. However, if at S56, the device determines that the audio user input dictates a lighting state change at any of the lighting device LD, then the receiving device sends an appropriate state change instruction to the other lighting device (step S58). Although not shown, each other lighting device (LD) so instructed will make the appropriate state change within the lighting device so that the light source of the respective other device provides the appropriate light output responsive to the user's input. The state changes by the detecting lighting devices and other lighting devices receiving such commands, for example, may cause some number lighting devices of the system to change state (e.g. ON/OFF, level, color characteristic(s), distribution, etc. as in the earlier discussion of changeable parameters), or cause lighting devices to implement a pulsing or other sequential variation of one or more of the controllable lighting parameters among some number of the lighting devices, etc. After sending any commands in S58, processing again advances to step S57 in which the lighting device that received the audio user input awaits a new user input.

Returning to consideration of step S53, assume next that the processor in the lighting device (LD) that received the user's spoken input determines that the input does not represent a simple command that the receiving device can handle itself. Hence, the processing branches from S53 to step S59, in which the processor causes that device to refer the matter to other devices/equipment for processing. The receiving device could forward the digitized audio to one or more other devices; however, in the example, the receiving device parses the audio down to a word or character string corresponding to the audio input. Hence, in step S59, the receiving device sends the string of parsed data to one or more other devices on the data communication network 23 of the lighting system 10, that is to say, for further processing thereof in "the cloud." Processing in the cloud will be performed on a distributed processing basis in a manner analogous to one or more of the procedures outlined above relative to FIGS. 2 and 3.

In step S60, one of the devices implementing the distributed processing of the parsed data in the cloud determines whether the audio input indicates that the user was apparently speaking intentionally to the lighting system 10. If not, the processing branches from S60 to step S61. In some cases, the system may take no action if the input was not directed to the system. In the example, however, the distributed processing by the system determines characteristics of detected speech, such as intonation and/or mode; and the system may adjust lighting parameters (S62) accordingly, for example, ON/OFF state, level, color characteristic(s), pulsing or other sequential variation among some number of lighting devices, etc. Lighting adjustment, for example, may entail sending appropriate light state change instructions to applicable lighting devices, similar to the operations discussed above relative to step S58; although at this point in the example, the adjustment may entail sending a similar command back to the lighting device that initially received the audio user input. After the adjustment at S62, processing again advances to step S57 in which the lighting device that received the user input awaits a new user input Returning to the processing at step S60, we will next assume that one of the devices implementing the distributed processing of the parsed data in the cloud instead determines that the audio input indicates that the user was apparently speaking intentionally to the lighting system 10. Hence, at this point in our example, the process flow branches from step S60 to step S63. To this point in the process, the deliberate input is not a simple command to change lighting. In step S63, one of the devices implementing the distributed processing of the parsed data in the cloud therefore determines whether or not the system 10 has data to provide an information response. If so, processing at step S64 changes a system state so as to process data representing the appropriate information, to enable a response output to the user as requested. Since the branch was from S63 to S64, at this point, the system has any data for the desired information output obtained from its own resources, e.g. information based on current system status, an indication of an error in processing the audio input, etc.

Alternatively, if the processing at S63 results in determination that the system does not have the data to respond, then processing instead branches from S63 to S65. In step S65, one of the devices implementing the distributed processing of the parsed data in the cloud instead sends an inquiry to an appropriate storage, server or the like providing as local storage on the network 23 or on the Internet (analogous to obtaining the data from the local storage/exchange server or via the Internet in the example of FIG. 5). After obtaining the data from another source in step S65, processing at step S64 changes a system state so as to process data representing the appropriate information to enable a response output to the user as requested.

In either of the examples regarding steps S63 to S65, after processing at step S64, the cloud processing leads to a step S66 in which data for output is sent to the appropriate lighting device(s). One or more lighting devices outputs the data as information responsive to the user input, again in a manner like that discussed above relative to FIG. 5. After sending the data to the device(s) that will output the information to the user in step S66, processing again advances to step S57 in which the lighting device that received the user input awaits a new user input.

The example of a process flow of FIG. 6 related to processing of an audio input representing recognizable speech. A similar process may be used to handle gestural input detected by one or more cameras or other types of optical sensors. For gestural detection, however, more of the initial image processing may be transferred to the cloud rather than leading to a receiving device recognition of a simple command. These procedures may also be adapted for handling of user inputs combining recognition of speech and gestures.

The examples outlined above may be modified, adapted or expanded in a variety of ways yet implement the interactive user interface via the lighting devices as descried herein. For example, instead of discrete input and output components as in the examples of devices 11A to 11L in FIGS. 1A and 1B, some or all of the relevant components may be combined. For example, for a light device configured to implement a sky simulation when installed in a ceiling, the light source and an image output device may be combined in a single unit that operates in a manner analogous to a video display such as a computer monitor. As another example, audio input and output components may use a single audio transducer, instead of discrete microphone and speaker. Also, the speaker and/or the microphone may be incorporated into a projector or other display unit that provides an image type information output.

Figure 9:
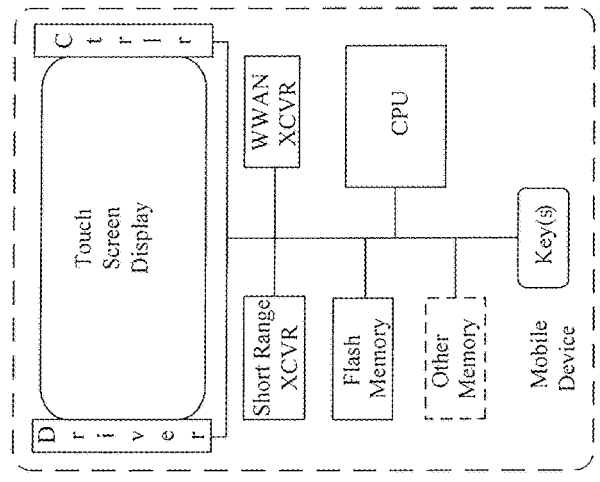
FIG. 9 is a simplified functional block diagram of a mobile device, as an alternate example of a user terminal device, for possible communication in or with the system of FIG. 1A.
Figure 8:
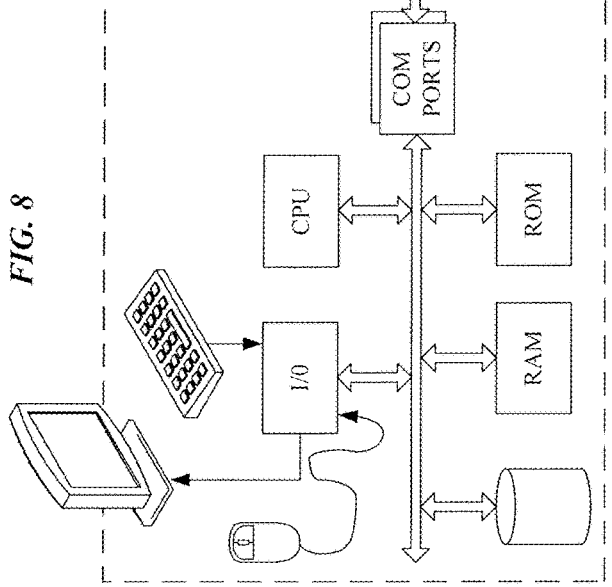
FIG. 8 is a simplified functional block diagram of a personal computer or other user terminal device, which may be used as the remote access terminal, in the system of FIG. 1A.
Figure 7:
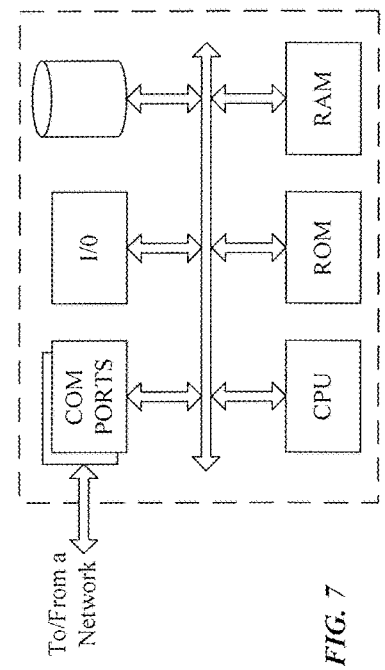
FIG. 7 is a is a simplified functional block diagram of a computer that may be configured as a host or server, for example, to function as the external server or a server if provided at the premises in the system of FIG. 1A.

As shown by the above discussion, at least some functions of devices associated or in communication with the networked lighting system 10 of FIG. 1A, such as elements shown at 27 and 29 (and/or similar equipment not shown but located at the premises 21), may be implemented with general purpose computers or other general purpose user terminal devices, although special purpose devices may be used. FIGS. 7-9 provide functional block diagram illustrations of exemplary general purpose hardware platforms.

FIG. 7 illustrates a network or host computer platform, as may typically be used to implement a host or server, such the computer 27. FIG. 8 depicts a computer with user interface elements, as may be used to implement a personal computer or other type of work station or terminal device, such as the terminal 29 in FIG. 1A, although the computer of FIG. 8 may also act as a server if appropriately programmed. The block diagram of a hardware platform of FIG. 9 represents an example of a mobile device, such as a tablet computer, smartphone or the like with a network interface to a wireless link, which may alternatively serve as a user terminal device like 29. It is believed that those skilled in the art are familiar with the structure, programming and general operation of such computer equipment and as a result the drawings should be self-explanatory.

A server (see e.g. FIG. 7), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Also, a computer configured as a server with respect to one layer or function may be configured as a client of a server in a different layer and/or for a different function. In a similar fashion, a central function or service 57A, 57B implemented as a server functionality on one or more lighting devices 11 with respect to client programming/functionality of other intelligent system elements at premises 21 may itself appear as a client with respect to a server in a different layer and/or for a different function such as with respect to a server 27.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 8). A mobile device (see FIG. 9) type user terminal may include similar elements, but will typically use smaller components that also require less power, to facilitate implementation in a portable form factor. The example of FIG. 9 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 7 and the terminal computer platform of FIG. 8 are shown by way of example as using a RAM type main memory and a hard disk drive for mass storage of data and programming, whereas the mobile device of FIG. 9 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 8). The mobile device example in FIG. 9 touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

Although FIGS. 7-9 in their present form show computers and user terminal devices, generally similar configurations also may be used within other elements of the lighting system 10. For example, one implementation of the brain, communication and interface elements of a lighting device may utilize an architecture similar to that of one of the computers or mobile terminals. As a more specific example, the personal computer type hardware in FIG. 8 (except for the keyboard, mouse and display) could serve as the brain and communication elements of a lighting device, where the input/output interface I/O would interface to an appropriate light driver and to any sensor(s) or other enhancement input or output device(s) included within the lighting device.

If provided on the system 10, additional system elements, such as a standalone sensor or an additional user interface device, they may be similarly implemented using an architecture like one of the devices of FIGS. 7-9. For example, an additional other user interface device (UI) might utilize an arrangement similar to the mobile device of FIG. 9, albeit possibly with only one transceiver compatible with the networking technology of the particular premises (e.g. to reduce costs).

For information about other examples of intelligent lighting devices, which may be suitable for use in a networked lighting system like that of FIG. 1A, attention may be directed to U.S. application Ser. No. 13/463,594 Filed May 3, 2012 entitled "LIGHTING DEVICES WITH INTEGRAL SENSORS FOR DETECTING ONE OR MORE EXTERNAL CONDITIONS AND NETWORKED SYSTEM USING SUCH DEVICES," the disclosure of which is entirely incorporated herein by reference.

As also outlined above, aspects of the interactive user interface and any associated distributed processing techniques of the lighting devices 11 may be embodied in programming of the appropriate system elements, particularly for the processors of intelligent lighting devices 11. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer of the lighting system service provider (e.g. implemented like the server computer shown at 27) into any of the lighting devices, etc. of or coupled to the system 10 at the premises 21, including programming for individual element functions, programming for user interface functions and programming for distributed processing functions. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
   intelligent lighting devices, each respective intelligent lighting device comprising:
   a light source;
   a communication interface configured to enable communication via a network link; and
   a processor coupled to control the light source and coupled to communicate via the communication interface and the network link with one or more others of the intelligent lighting devices and configured to control operations of at least the respective intelligent lighting device, wherein:
   at least one of the intelligent lighting devices includes a user input sensor configured to detect user activity related to user inputs, from a user within the vicinity of the user input sensor, without requiring physical contact of the user;
   at least one of the intelligent lighting devices includes an output component configured to provide information output to a user within the vicinity of the output component; and
   a respective intelligent lighting device further comprises an application program that is independent from a system program for execution on the processor of the respective intelligent lighting device, wherein execution of the application program by the processor of the respective intelligent lighting device configures the lighting system to implement a non-lighting related service defined by the application program, including functions to:
   process user inputs detected by the user input sensor; and
   obtain and provide information as an output via the output component, for the non-lighting related service, in response to a processed user input.

2. The system of claim 1, further comprising a data communication network at a premises serviced for lighting by the system, the network interconnecting the links to provide data communications amongst the intelligent lighting devices, wherein:
   the data communication network is configured to further provide data communications for at least some of the intelligent lighting devices via a wide area network outside the premises, and
   the function to obtain the information comprises communicating with an information source outside the premises via the data communication network at the premises and the wide area network.

3. The system of claim 1, wherein one of the intelligent lighting devices includes both the input component and the output component.

4. The system of claim 1, wherein:
   the user input sensor is configured to detect an optical input; and
   the function to process the user inputs comprises processing the detected optical input to identify a gesture of a user.

5. The system of claim 4, wherein the user input sensor comprises an image detector.

6. The system of claim 4, wherein the user input sensor comprises a device configured for detection of direction and intensity of received light.

7. The system of claim 1, wherein the function to process the user inputs comprises processing the user inputs in a distributed processing manner via a plurality of the processors of intelligent lighting devices.

8. The system of claim 1, wherein the system program is a core function layer that implements driver or interface functions for converting between the inputs and outputs of a state machine and signals produced by or used to drive input or output components.

9. The system of claim 1, wherein the system program is an operating system.

10. An intelligent lighting device, comprising:
a light source;
a communication interface configured to enable communication via a network link; and
a processor coupled to control the light source and coupled to communicate via the communication interface and the network link with one or more others of a plurality of intelligent lighting devices;
a user input sensor configured to detect user activity related to user inputs, from a user within the vicinity of the intelligent lighting device, without requiring physical contact of the user;
an output component configured to provide information output to the user within the vicinity of the intelligent lighting device;
a memory accessible to the processor; and
an application program that is independent from a system program for execution on the processor stored in the memory, wherein execution of the application program by the processor configures the intelligent lighting device to implement a non-lighting related service defined by the application program, including functions to:
process user inputs detected by the user input sensor; and
obtain and provide information as an output via the output component, for the non-lighting related service, in response to a processed user input.

11. The intelligent lighting device of claim 10, wherein the function to obtain the information comprises communicating with an information source via the network link.

12. The intelligent lighting device of claim 10, wherein:
the user input sensor comprises an audio detector; and
the function to process the user inputs comprises detecting spoken words in the audio inputs.

13. The intelligent lighting device of claim 10, wherein:
the user input sensor comprises an optical detector; and
the function to process the user inputs comprises processing detected optical inputs to recognize gestural user inputs.

14. The intelligent lighting device of claim 13, wherein the optical detector comprises a camera.

15. The intelligent lighting device of claim 13, wherein the optical detector comprises a device configured for detection of direction and intensity of received light.

16. The intelligent lighting device of claim 10, wherein the output component is configured to provide the information output to the user in an audio and/or visual format.

17. A system, comprising:
intelligent lighting devices, each respective intelligent lighting device comprising:
a light source;
a communication interface configured to enable communication via a network link; and
a processor coupled to control the light source and coupled to communicate via the communication interface and the network link with one or more others of the intelligent lighting devices and configured to control operations of at least the respective intelligent lighting device, wherein:
at least one of the intelligent lighting devices includes a user input sensor configured to detect user activity related to user inputs, from a user within the vicinity of the user input sensor, without requiring physical contact of the user;
at least one of the intelligent lighting devices includes an output component configured to provide information output to a user within the vicinity of the output component; and
a respective intelligent lighting device further comprises programming or configuration data for the processor of the respective intelligent lighting device to configure the respective intelligent lighting device to:
implement an operating system environment for execution of one or more application programs that are independent from a system program by the processor of the respective intelligent lighting device, wherein execution of one of the one or more application programs configures the lighting system to implement a non-lighting related service defined by the one application program, including functions to:
process user inputs detected by the user input sensor; and
obtain and provide information as an output via the output component, for the non-lighting related service, in response to a processed user input; and
implement one or more application programming interfaces (APIs) to facilitate implementing the non-lighting related service.

18. The system of claim 17, wherein the implemented operating system environment is a real-time operating system environment.

19. The system of claim 17, further comprising a data communication network at a premises serviced for lighting by the system, the network interconnecting the links to provide data communications amongst the intelligent lighting devices, wherein:
the data communication network is configured to further provide data communications for at least some of the intelligent lighting devices via a wide area network outside the premises, and
the function to obtain the information comprises communicating, via one of the one or more APIs and over the data communication network at the premises and the wide area network, with an information source outside the premises.

20. The system of claim 17, wherein one of the intelligent lighting devices includes both the input component and the output component.

21. An intelligent lighting device, comprising:
a light source;
a communication interface configured to enable communication via a network link; and
a processor coupled to control the light source and coupled to communicate via the communication interface and the network link with one or more others of a plurality of intelligent lighting devices;
a user input sensor configured to detect user activity related to user inputs, from a user within the vicinity of the intelligent lighting device, without requiring physical contact of the user;
an output component configured to provide information output to the user within the vicinity of the intelligent lighting device;
a memory accessible to the processor; and
programming or configuration data for the processor of the intelligent lighting device stored in the memory to configure the intelligent lighting device to:

implement an operating system environment for execution of one or more application programs that are independent from a system program by the processor of the intelligent lighting device, wherein execution of one of the one or more application programs configures the intelligent lighting device to implement a non-lighting related service defined by the one application program, including functions to:

process user inputs detected by the user input sensor; and obtain and provide information as an output via the output component, for the non-lighting related service, in response to a processed user input; and implement one or more application programming interfaces (APIs) to facilitate implementing the non-lighting related service.

22. An intelligent lighting device, comprising:

a light source;

a communication interface configured to enable communication via a network link; and a processor coupled to control the light source and coupled to communicate via the communication interface and the network link with one or more others of a plurality of intelligent lighting devices;

a memory accessible to the processor; and programming or configuration data for the processor of the intelligent lighting device stored in the memory to configure the intelligent lighting device to implement an operating system environment for the intelligent lighting device providing one or more application programming interfaces (APIs) to configure the intelligent lighting device to implement a non-lighting related service defined by an application program that is independent from a system program.

23. The intelligent lighting device of claim 22, wherein the implemented service is a non-lighting related service.

24. The intelligent lighting device of claim 22, wherein the implemented service is a lighting related service.

25. The intelligent lighting device of claim 22, wherein one of the implemented one or more APIs enables the implemented service to function in a distributed processing manner via the plurality of intelligent lighting devices.

* * * * *